(12) United States Patent
Pepper

(10) Patent No.: US 7,774,130 B2
(45) Date of Patent: Aug. 10, 2010

(54) METHODS AND SYSTEM FOR DETERMINING CONSUMPTION AND FUEL EFFICIENCY IN VEHICLES

(76) Inventor: Gary Thomas Pepper, 417 Amberwood Road, R.R.#3, Ashton, Ontario K0A 1B0 (CA)

( * ) Notice: Subject to any disclaimer, the term of this patent is extended or adjusted under 35 U.S.C. 154(b) by 1167 days.

(21) Appl. No.: 11/393,716

(22) Filed: Mar. 31, 2006

(65) Prior Publication Data

US 2007/0129878 A1 Jun. 7, 2007

(51) Int. Cl.
*G06F 19/00* (2006.01)
(52) U.S. Cl. .............. 701/123; 701/35; 701/36; 701/103; 701/104; 340/439; 340/450
(58) Field of Classification Search ............. 701/23, 701/24, 29, 35, 36, 33, 102, 103, 104, 123; 340/438, 439, 442, 450, 450.2
See application file for complete search history.

(56) References Cited

U.S. PATENT DOCUMENTS 6,594,579 B1   7/2003  Lowrey
6,988,033 B1   1/2006  Lowrey
7,159,623 B1 * 1/2007  Carr et al. .................... 141/94

OTHER PUBLICATIONS

Emission Test Cycles, SFTP-US06, published by Dieselnet at "www.dieselnet.com/standards/cycles/ftp_us06.html" in Apr. 2000.
AutoMath Handbook, by John Lewlor published by Berkely Publishing Group, New York, 1992.
2005 My OBD System Operation, Summary for Gasoline Engines, published by Ford Motor Company, Apr. 28, 2004.

* cited by examiner

*Primary Examiner*—Gertrude Arthur Jeanglaud

(57) ABSTRACT

A method of determining fuel consumption in a vehicle through the OBDII bus is described. The fuel consumption is determined by using mass air flow (MAF) sensor data or manifold air pressure (MAP) sensor data, and obtaining and applying long term and short term fuel trim values for the vehicle, which respectively characterize deviations of air-to-fuel stoichiometry in the vehicle due to aging and vehicle's current operating conditions to determine the corrected fuel consumption in the vehicle. For MAP based method, an independent determining of Volumetric Efficiency of a vehicle's engine is also provided. The method is further enhanced by providing various sensing patterns for various sensor data, which depend on the rate of change of the respective data.

29 Claims, 8 Drawing Sheets

METHODS AND SYSTEM FOR DETERMINING CONSUMPTION AND FUEL EFFICIENCY IN VEHICLES

FIELD OF THE INVENTION

The present invention relates to remote diagnostic of vehicles, and in particular, to methods and system for determining fuel consumption and fuel efficiency in vehicles using data obtained via the OBDII diagnostic port or the like.

BACKGROUND OF THE INVENTION

Since 1996, all light and medium duty vehicles manufactured for sale in North America have been equipped with an on-board diagnostic II (OBDII) system. The primary objective of the OBDII system was to reduce vehicle emissions via the real-time monitoring of engine function and emissions systems. All OBDII-equipped light/medium-duty vehicles use a Mass Airflow (MAF) and/or Manifold Air Pressure (MAP) sensors to provide real time input and feedback to the engine's fuel management system. The fuel management system is operated in real-time by one of the vehicle's Electronic Control Units (ECU), known as the Powertrain Control Module (PCM). In vehicles that are appropriately equipped, real-time sampled MAF and/or MAP sensor data can be requested from the PCM, via the OBDII diagnostic port. Either of these parameters can be used to calculate the fuel consumption of a vehicle.

Although there have been previous prior art attempts to determine vehicle's fuel efficiency, see e.g. U.S. Pat. Nos. 6,594,579 and 6,988,033 to Lowrey et al, the need still exists in the automotive industry for developing accurate and reliable methods for determining fuel consumption and fuel efficiency in vehicles.

SUMMARY OF THE INVENTION

The present patent application describes how to determine the fuel consumption and fuel efficiency by using OBDII data, for vehicles equipped with MAF and/or MAP sensors. The method is preferably carried out in-vehicle by using the assignee's OBDII-connected device, known as the Vehicle Interface Unit, or VIU. The data is relayed wirelessly to intelligent collection points, known as VIUPoints or gateways, and then aggregated in a central host (server), including a central database and web-based application collectively known as OverVIU, for generation of web-based reports, including fuel consumption and fuel efficiency. A complete system including VIUs, VIUPoints and OverVIU is described in the previously filed applications to the same assignee, the U.S. patent application Ser. No. 10/909,007 filed Aug. 2, 2004 to Zoladek et al entitled "VEHICLE TELEMETRIC SYSTEM", and PCT patent application Ser. No. PCT/CA2005/001150 filed Jul. 21, 2005 to Zoladek et al entitled "MULTI-USER MOTOR VEHICLE TELEMETRIC SYSTEM AND METHOD", both patent applications being incorporated herein by reference.

According to one aspect of the invention there is provided a method of determining fuel consumption in a vehicle, comprising the steps of:
(a) determining fuel consumption by using mass air flow (MAF) sensor data or manifold air pressure (MAP) sensor data, including obtaining MAF data or MAP data in the vehicle;

the step (a) comprising:
(b) obtaining long term and short term fuel trim values for the vehicle, which respectively characterize deviations of air-to-fuel stoichiometry in the vehicle due to aging and vehicle's current operating conditions, and
(c) correcting fuel consumption in the vehicle determined in the step (a) by applying said long term and short term fuel trim values to determine the corrected fuel consumption in the vehicle.

The steps of the method described above comprise sensing vehicle's data through a vehicle's bus. Conveniently, the step (a) comprises determining fuel consumption in the vehicle by using MAP data, only if MAF data is not available for the vehicle. The step (b) comprises obtaining a number of banks (pairs) of respective fuel trim values for each of the long term and short term fuel trim values, and determining average long term and short term fuel trim values over the respective number of banks. Typically, the number of banks is less or equal to 4.

Beneficially, the step (b) comprises sensing various vehicle's data at respective various frequencies, which are substantially inversely proportional to the rate of change of the respective vehicle's data. Conveniently, the steps of sensing comprise sensing vehicle's data through onboard diagnostic II (OBDII) bus.

According to one embodiment of the invention, the step (a) comprises determining fuel consumption in the vehicle by using MAF data for the time interval $\Delta T = N \cdot \Delta t_i$ as follows:

$$\frac{1}{AF_{ratio} \times \rho_{fuel} \times 1000 \text{ ml/l}} \sum_{i=1}^{N} (MAF(t_i) \times \overline{LONGFT_i} \times \overline{SHRTFT_i} \times \Delta t_i)$$

wherein $AF_{ratio}$ is air-to-fuel stoichiometric ratio, $\rho_{fuel}$ is fuel density in g/ml, $MAF(t_i)$, $LONGFT_i$, and $SHRTFT_i$ are respectively MAF data, average long term, and average short term fuel trim data at time instance $t_i$. The step (a) further comprises sensing a revolution per minute (RPM), and intake air temperature (IAT) in the vehicle.

According to another embodiment of the invention, the step (a) comprises determining fuel consumption in the vehicle by using MAP data for the time interval $\Delta T = N \cdot \Delta t_i$ as follows:

$$\frac{VE \times ED \times M_{air}}{120 \times R \times AF_{ratio} \times \rho_{fuel} \times 1000 \text{ ml/l}}$$

$$\sum_{i=1}^{N} \frac{RPM_i \times MAP_i \times \overline{LONGFT_i} \times \overline{SHRTFT_i}}{(IAT_i + 273.12)} \Delta t_i$$

wherein VE is Volumetric Efficiency for the vehicle (unitless), MAP is Manifold Air Pressure (kPa), ED is Engine Displacement (litres), R is ideal gas constant 8.314 kPa K$^{-1}$ mol$^{-1}$, and $M_{air}$ is molar mass of air (g/mol)=28.97 g/mol; $RPM_i$, $MAP(t_i)$, $LONGFT_i$, $SHRTFT_i$ and $IAT_i$ are respectively engine's Revolution Per Minute (min$^{-1}$), Manifold Air Pressure sensor data, average long term, average short term fuel trim data, and Intake Air Temperature (degrees Celsius) at time instance $t_i$.

In the method described above, the step (a) of determining fuel consumption by using MAP data further comprises determining vehicle's volumetric efficiency (VE) as follows:

(i) selecting time interval and setting VE=1;
(ii) determining total fuel consumed by the vehicle during all selected time intervals according to an independent refuelling measurement ($TFC_M$);
(iii) determining total fuel consumed by the vehicle during all selected time intervals according to the method of claim 3 ($TFC_v$) by using the current value of VE;
(iv) updating the current value of VE=$TFC_M/TFC_v$;
(v) selecting another time interval and repeating the steps (ii) to (iv) a number of times to achieve a required accuracy for the current value of VE.

Conveniently, the step (ii) comprises manual or automatic refuelling measurement at a gas pump.

Sampling of various data can be performed in one or more of the following ways:
  sensing data at respective frequencies, which are substantially inversely proportional to the rates change of respective data;
  sensing data consecutively;
  sensing data concurrently;
  sensing data according to a random selection of their sampling order;
  sensing some data at a sampling frequency, which is dependent on the value of another data.

For example, sensing of MAP, RPM and IAT is performed in one or more of the following ways:
  sensing MAP and RPM at substantially same frequency, and sensing IAT at a lower frequency;
  sensing MAP, RPM and IAT data at respective frequencies, which are substantially inversely proportional to the rates change of respective data;
  sensing MAP and RPM consecutively;
  sensing MAP and RPM concurrently;
  sensing MAP and RPM according to a random selection of their sampling order;
  sensing IAT at a sampling frequency, which is dependent on the value of RPM.

The steps (a) and (b) of the method may comprise sampling various vehicle's data at respective various sampling frequencies, which are based on historic data for the respective vehicle's data.

If required, fuel density $\rho_{fuel}$ shown in the above equations may be adjusted according to seasonal temperature variations.

Beneficially, the method described above further comprises transmitting the data obtained in any of the steps (a) to (c) from the vehicle to a central host for further processing and storage, wherein the transmitting to the central host is performed as follows: wirelessly transmitting the fuel consumption data from the vehicle to a gateway (wireless access point) connected to a communications network, the communications network enabling the transfer of data between the gateway and the central host.

The steps (a) and (c) of the method may comprise distributed determining of fuel consumption by using processing power of more than one computer, including initial processing of data in the vehicle, followed by final processing of data at the central host.

The method described above further comprises determining fuel efficiency, comprising obtaining an odometer reading for the vehicle, and relating the fuel consumed by the vehicle over the distance identified by the odometer reading for the corresponding time interval to determine fuel efficiency.

Additionally, the method may further comprise identifying if the vehicle is a hybrid electric vehicle (HEV), and determining fuel consumption in the HEV in accordance with the method described above during time intervals when the HEV does not operate under electric power.

According to another aspect of the invention there is provided a vehicle interface unit (VIU), comprising:
  a (VIU) computer having a CPU and non-volatile memory (NVM);
  the VIU computer is connected to a vehicle bus providing access to sensors in the vehicle for collecting vehicle related data through the vehicle bus;
  the VIU computer is programmed to determine fuel consumption in the vehicle in accordance with the method described above.

The VIU computer comprises a computer program code stored in the NVM for execution by the CPU to perform the steps of the method described above.

The VIU further comprises a wireless modem connected to the VIU computer and providing communication over a wireless link with a gateway (wireless access point), which is connected to a communications network, the communications network providing transmission of data between the gateway and a central host.

According to yet another aspect of the invention there is provided a vehicle telemetric system, comprising:
  a central host connected to a communications network;
  one or more gateways connected to the communications network, the communications network enabling the transfer of data between the gateways and the central host;
  a vehicle interface unit (VIU) within a vehicle having access to sensors in the vehicle for collecting vehicle related data through a vehicle's bus, the VIU having means for communication over a wireless link with any of said gateways when the vehicle is within a transmission range of one of said gateways;
  the VIU comprising a VIU computer having a CPU and non-volatile memory (NVM);
  the VIU computer is connected to the vehicle bus and programmed to determine fuel consumption in the vehicle in accordance with the method described above.

According to one more aspect of the invention there is provided a vehicle interface unit (VIU) for a vehicle telemetric system, comprising a central host connected to a communications network and one or more gateways connected to the communications network, which enables the transfer of data between the gateways and the central host, the VIU being located in a vehicle and having access to sensors in the vehicle for collecting vehicle related data through a vehicle's bus, the VIU having means for communication over a wireless link with any of said gateways, the wireless link being activated when the vehicle is within a transmission range of the one of said gateways, and another wireless link being activated when the vehicle is within a transmission range of another one of said gateways;
  the VIU further comprising a VIU computer having a CPU and non-volatile memory (NVM);
  the VIU computer is connected to the vehicle's bus and programmed to determine fuel consumption in the vehicle in accordance with the method described above.

According to one more aspect of the invention there is provided an access system for use in a vehicle telemetric system, the telemetric system comprising a central host connected to a communications network, the access system comprising:
  one or more vehicle interface units (VIUs) and a gateway, the gateway being connected to the communications network, each VIU being located in a different vehicle and having access to sensors in the vehicle for collecting vehicle related data through a vehicle's bus, each VIU having means for communication over a wireless link with the gateway, the wireless link being activated when the vehicle is within a transmission range of the gateway;

each VIU comprising a VIU computer having a CPU and non-volatile memory (NVM);

the VIU computer being connected to the vehicle's bus and programmed to determine fuel consumption in the vehicle in accordance with the method described above;

the gateway having another memory for storing the fuel consumption data received from the VIU and a gateway means for forwarding the data to the central host.

According to yet one more aspect of the invention there is provided a method for determining a vehicle's fuel consumption in a vehicle telemetric system comprising a central host connected to a communications network, one or more gateways connected to the communications network, each gateway having a wireless transmission range, a vehicle interface unit (VIU) within a vehicle having access to sensors in the vehicle for collecting vehicle related data through a vehicle's bus, the VIU having means for wireless communication with any of said gateways, the method comprising the steps of:

(a) determining fuel consumption by using mass air flow (MAF) sensor data or manifold air pressure (MAP) sensor data, including obtaining MAF data or MAP data in the vehicle;

the step (a) comprising:

(b) obtaining long term and short term fuel trim values for the vehicle, which respectively characterize deviations of air-to-fuel stoichiometry in the vehicle due to aging and vehicle's current operating conditions, and (c) correcting fuel consumption in the vehicle determined in the step (a) by applying said long term and short term fuel trim values to determine the corrected fuel consumption in the vehicle.

and storing the corrected fuel consumption in a VIU memory;

(d) determining if the VIU is within the wireless transmission range of one of the gateways;

(e) forwarding some or all the fuel consumption data from the VIU to the one of said gateways over a wireless link;

(f) forwarding said some or all of the fuel consumption data received by the one of said gateways from the one of said gateways to the central host over the communications network; and (g) notifying each gateway by the central host regarding said some or all fuel consumption data that have been already received at the central host.

According to one more aspect of the invention there is provided a multi-user motor vehicle telemetric system, comprising:

(a) one or more central hosts connected to a communications network, each central host being associated with one or more users of the system;

(b) one or more gateways connected to the communications network, the communications network enabling the transfer of data between the gateways and the central hosts;

(c) one or more vehicle interface units (VIUs), each placed within a vehicle having access to sensors in the vehicle for collecting vehicle related data through the vehicle's bus, each VIU having means for communication over a wireless link to gateways designated to be accessed by said each VIU when the VIU of the vehicle is within a transmission range of one of said designated gateways, and wherein each VIU is associated with one or more of the users;

(d) each central host having means for selecting gateways for collecting data from each VIU which is associated with the users that the central host is associated with;

(e) each gateway having means for recognizing the association between central hosts and VIUs belonging to the same user; and (f) each VIU comprising a VIU computer having a CPU and non-volatile memory (NVM); and (g) the VIU computer being connected to the vehicle's bus and programmed to determine fuel consumption in the vehicle in accordance with the method described above.

According to yet another aspect of the invention there is provided a method for collecting vehicle performance data in a multi-user motor vehicle telemetric system, comprising one or more central hosts connected to a communications network, each central host being associated with one or more users of the system, one or more gateways connected to the communications network, the communications network enabling the transfer of data between the gateways and the central hosts, one or more vehicle interface units (VIUs), each placed within a vehicle having access to sensors in the vehicle for collecting vehicle related data, each VIU having means for communication over a wireless link to gateways designated to be accessed by said each VIU when the VIU of the vehicle is within a transmission range of one of said designated gateways, and wherein each VIU is associated with one or more of the users, the method comprising:

(a) at each central host, selecting gateways for collecting data from each VIU which is associated with the users that the central host is associated with;

(b) at each central host specifying for each user the data to be collected from its associated VIUs through data collection profiles which are stored in the central host and the selected gateways;

(c) at each gateway determining the association between central hosts and VIUs belonging to the same user; and (d) at each VIU, determining fuel consumption in the vehicle where the VIU is placed in accordance with the method described above.

BRIEF DESCRIPTION OF THE DRAWINGS

The invention will now be described in greater detail with reference to the attached drawings, in which.

DESCRIPTION OF THE EMBODIMENTS OF THE INVENTION

Figure 1:
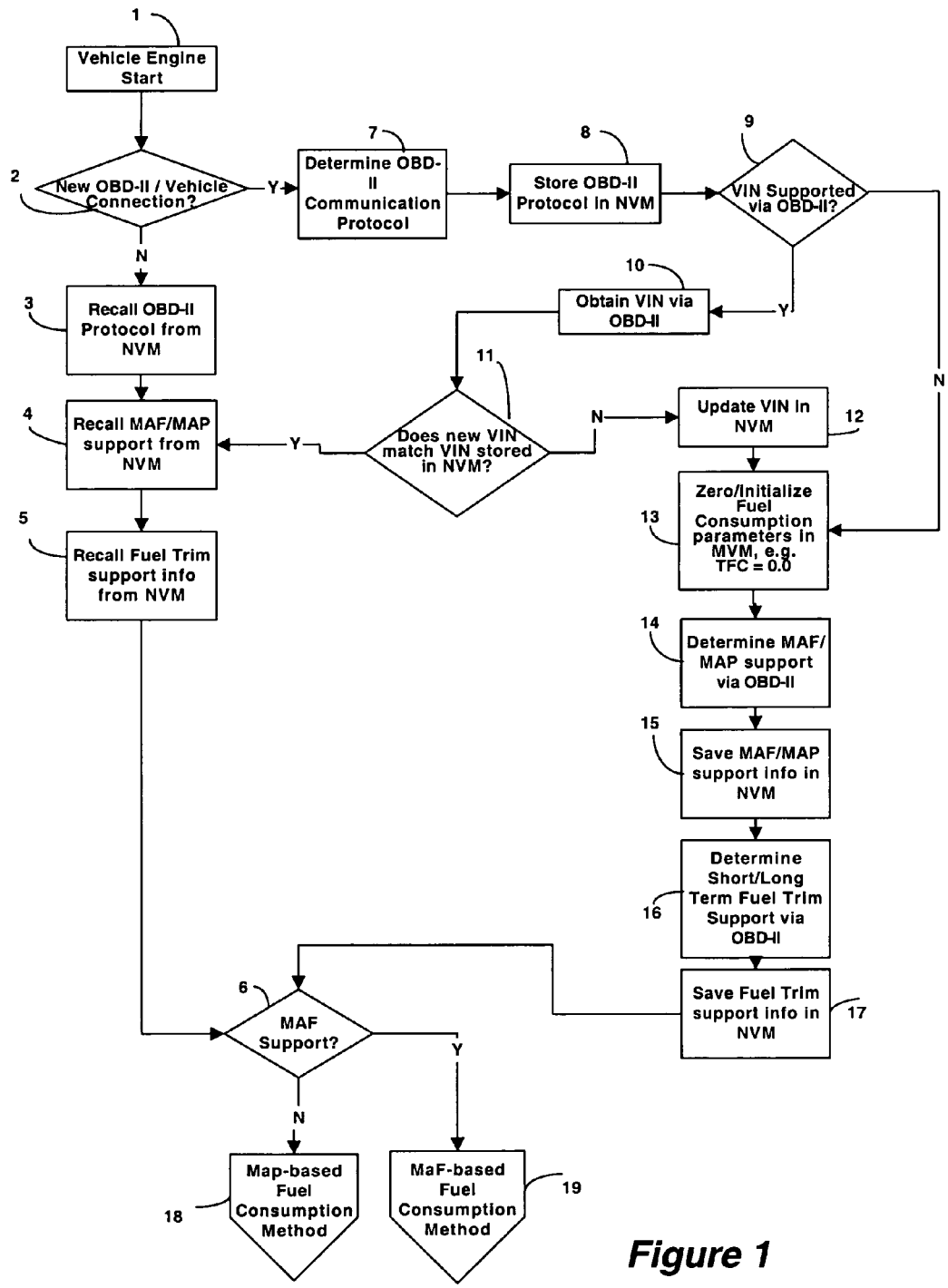
FIG. 1 shows a method for determining MAF/MAP support in a vehicle, including vehicle start-up and initialization.

Methods for determining fuel consumption and fuel efficiency in vehicles described in this patent application are based upon the availability of Mass AirFlow (MAF) or Manifold Air Pressure (MAP) data from the OBDII vehicle bus. The VIU initially determines what sensors are supported by the vehicle's OBDII system before any fuel consumption calculation commences.

The OBDII port can be interrogated to determine whether MAF, MAP or both MAF and MAP sensors are supported in any OBDII compliant vehicle. This is accomplished using a Mode or Service $01 request, as defined in the SAE J1979 specification. This OBDII interrogation for MAF/MAP sensor support is performed in an autonomous manner by the VIU and does not requiring any pre-configuration or user intervention.

OBDII interrogation to determine MAF and/or MAP support is performed only once by the VIU, after the VIU is first installed in a vehicle. When the VIU detects the first engine start after installation, an OBDII query is automatically performed by the VIU to determine MAF/MAP support. The VIU stores the MAF/MAP support information in non-volatile (NVM) memory for subsequent recall. The VIU has the capability to detect that it has been removed from a vehicle and installed in a different vehicle, via the detection of a power-cycling event as the OBDII port is always powered, even when the vehicle's engine is off. If the VIU detects such an event, it will automatically determine MAF/MAP support for the new vehicle, and will update the relevant information contained in non-volatile memory.

If both MAF and MAP are supported in a vehicle, then the fuel consumption calculation will default to using only MAF data as the basis for the fuel calculations. No practical advantage is gained by using MAP data over MAF for the purpose of determining fuel consumption. The use of MAF over MAP, however, requires fewer parameters to be requested in real-time via OBDII and is, therefore, advantageous by virtue of simplicity.

The determination of fuel efficiency, expressed in units of litres per 100 kilometers or miles per gallon, requires the measurement of distance that the vehicle has travelled. The OBDII data link does not directly provide a generic method to directly determine the distance travelled in a given time period. Instead, the standard practice of integrating the vehicle's speed with respect to time, to determine the distance travelled, is employed. The Vehicle Speed Sensor (VSS) can be interrogated via the OBDII port to sample the vehicle's current speed. Using an appropriate sampling interval, integrating VSS with respect to time can yield an accurate measurement of the distance travelled by a vehicle. This technique is analogous to that used by systems within the vehicle to derive the odometer value. In the VIU, the VSS is typically sampled once or twice a second when the engine is running, for the purpose of the calculation of distance travelled by the VIU.

First Embodiment of the Invention

In the case of MAF-equipped vehicles, the MAF sensor provides the PCM with a calibrated measurement of the rate of the mass of air flowing into the engine (i.e. at the air intake manifold). According to the SAE J1979 specification, OBDII MAF data is mandated to be reported in units of grams per second of air.

A good approximation of the instantaneous fuel consumption rate (fuel rate) by a vehicle, while the engine's fuel system is in closed-loop mode of operation is given by:

$$\text{fuel rate (litres/s)} = \frac{MAF\ (g/s)}{AF_{ratio} \times \rho_{fuel}(g/ml) \times 1000\ ml/l} \quad (1)$$

In equation (1), $AF_{ratio}$ is the ideal air-to-fuel stoichiometric ratio and $\rho_{fuel}$ is the fuel density in g/ml. An internal combustion engine operates at maximum efficiency when the air-to-fuel ratio is ~14.7:1 (i.e. $AF_{ratio}$=14.64, see reference 1). For regular unleaded fuel, $\rho_{fuel} \approx 0.74$ g/ml. The density of a given fuel grade can vary regionally, seasonally and is temperature dependent.

Since the OBDII port provides real-time sampled engine data, the fuel consumed (FC), in the i'th time interval can be written as;

$$FC(t_i) = \frac{MAF(t_i)}{AF_{ratio} \times \rho_{fuel} \times 1000\ ml/l} \times \Delta t_i \quad (2)$$

where $\Delta t_i = t_i - t_{i-1}$, in seconds (i.e. the time between consecutive samples of MAF).

In equation (2), the units of fuel consumed are litres, if the units of the variables are kept consistent with that expressed in equation (1).

The fuel consumed (in litres) in an arbitrary time interval $\Delta T$ can be computed via the numerical integration (with respect to time) of equation (2). If $t_0$ and $t_N$ are the start and end, respectively, of the time interval $\Delta T$ (i.e. $\Delta T = t_N - t_0$), then the fuel consumed in $\Delta T$ is given by $$FC(\Delta T) = \sum_{i=1}^{N} FC(t_i) \quad (3)$$
$$= \sum_{i=1}^{N} \frac{MAF(t_i)}{AF_{ratio} \times \rho_{fuel} \times 1000\ ml/l} \times \Delta t_i$$

Long Term and Short Term Fuel Trim Values

Equation (3) is a good estimate of fuel consumption during closed fuel loop engine operation. It does not, however, include significant fuel corrections applied by the PCM in real-time that are collectively termed "fuel trim" parameters. As fuel systems age or otherwise change over the operational lifetime of a vehicle, the PCM employs an adaptive fuel strategy to modify the air/fuel stoichiometry while running in closed fuel loop. The PCM "learns' these deviations and stores them as long term fuel trim values (LONGFT) in the PCM's keep-alive memory. They are stored in the PCM in as a function of rpm/load or as a function of air mass. The short-term fuel trim (SHRTFT) values are dynamically re-computed "on-the-fly" by the ECU as the vehicle's operating conditions vary. The long and short-term fuel trim values are used to modify the pulse width applied to the fuel injectors and hence directly affect the amount of fuel consumed.

A more detailed description of determining short-term and long-term fuel trim values, including details of fuel control in internal combustion gasoline engines is presented below.

The purpose of the air/fuel ratio control system is to achieve an ideal air/fuel mixture within the combustion chamber. The goal is to provide maximum power while minimizing emissions and maximizing fuel economy. The PCM relies on a network of input sensors and output actuators to precisely control the air/fuel mixture within the combustion chamber.

The amount of fuel delivered by the fuel injector is determined by the fuel control system. The mass of fuel injected into each cylinder depends upon the mass of air (oxygen) entering the engine, the fuel mass required to achieve the desired air/fuel ratio, and the injector pulse width required to deliver the correct amount of fuel to the proper cylinder.

The air mass flowing into each cylinder is determined by the PCM using either MAF or MAP sensor input. From the current engine operating conditions (e.g. load, rpm, throttle position, engine coolant temperature etc), the desired air/fuel ratio is determined by the PCM, followed by calculation of the desired fuel mass for each cylinder. Subsequently, the PCM calculates the appropriate fuel injector pulse width, required to deliver the desired fuel mass to each cylinder. The fuel injector pulse-width, measured in milliseconds, is the length of time that the PCM turns on the fuel injector.

Fuel delivery is performed in one of two modes: open or closed loop. In open loop, the PCM determines fuel delivery based upon sensor inputs (except the oxygen, or $O_2$ sensor) and fuel delivery algorithms contained within the PCM. Closed loop fuel delivery is based upon fuel delivery algorithms contained within the PCM and the input of many sensors, including $O_2$ sensors.

The air/fuel ratio is ideally 14:64:1 under normal (closed loop) operating engine operating conditions, but can vary between 12:1 (rich) and 18:1 (lean) during open-loop conditions.

The PCM generally commands open-loop fuel system operation during the following conditions: cold engine start-up, high engine load or wide open throttle (WOT), or over-temperature protection of the catalyst. When the engine is operation in open loop, the PCM commands a rich or lean air/fuel ratio and uses air mass to calculate the appropriate injector pulse width. As mentioned previously, $O_2$ sensor data is not used during open-loop operation. As soon as engine conditions permit, the PCM will enter into closed-loop operation as this is the most efficient mode of operation, resulting in the least exhaust emissions.

After vehicle cold-engine start-up, the vehicle remains in open loop mode until the $O_2$ sensors reach operating temperature and other engine operating conditions are met (such as the engine coolant temperature reaching a minimum temperature threshold). Other non-normal engine operating conditions, such as during extreme acceleration (WOT), safety considerations outweigh efficient operation of the engine. For WOT conditions, the air/fuel ratio is non-stoichiometric (i.e. the air/fuel ratio is less than 14.64:1) for best power and the engine is operated in open loop.

During closed loop operation, the PCM uses $O_2$ sensor data to precisely control the air/fuel mixture within the combustion chamber. The goal of the PCM is to provide maximum power while minimizing emissions and maximizing fuel economy (i.e. a stoichiometric air/fuel ratio of 14.64:1). The PCM once again calculates the "base" amount of fuel to deliver to each cylinder (also using MAF/MAP sensor input), but also uses feedback from the oxygen sensor to determine if the air/fuel mixture is rich or lean. The PCM uses this data to "fine tune" or adjust the commanded fuel injector pulse width (the amount of fuel injected into a cylinder is proportional to the injector pulse width) until a stoichiometric air/fuel ratio is achieved.

The conventional $O_2$ sensor can only indicate if the air/fuel mixture is richer or leaner than stoichiometric via monitoring the amount of oxygen in the exhaust. During closed loop operation, PCM uses real-time $O_2$ sensor data to dynamically adjust the air/fuel ratio many times per second. This dynamic correction of the air/fuel ratio during closed loop operation is termed "short term fuel trim" (SHRTFT). The short term fuel trim is a numerical multiplier that is used to adjust the "base pulse width" of the fuel injector, thereby providing a precise adjustment to the amount of fuel delivered to each cylinder. The PCM constantly makes adjustments to the short term fuel trim, in order to cause the oxygen sensor voltage to switch from rich to lean around the stoichiometric point. In doing so, the PCM maintains the proper stoichiometric air/fuel ratio.

The SHRTFT values calculated by the PCM and reported by the OBDII system usually fluctuate above and below a zero percent correction. Zero percent correction translates into zero adjustment to the air/fuel ratio and hence the SHRTFT multiplier is unity (i.e. 1). If the percentage is positive (the mixture is lean), the PCM uses a SHRTFT multiplier of greater than unit. Conversely, if the correction is a negative percentage (the mixture is rich), then the SHRTFT multiplier is less than unity.

When initially entering closed loop operation, the SHRTFT starts at zero percent (i.e. a unity multiplier) and begins adding or subtracting fuel in order to make the oxygen sensor switch from its current state. The adding or subtracting of fuel depends upon the feedback from the $O_2$ sensor.

Thus, taking into account the above noted discussion, equation (3) can be extended to incorporate the long and short-term fuel trim values, which can be queried via the OBDII port. Assuming that only 1 pair of short/long term fuel trim values are supported in a vehicle and available via OBDII, then $$FC(\Delta T) = \sum_{i=1}^{N} FC(t_i) \qquad (4)$$

$$= \sum_{i=1}^{N} \frac{MAF(t_i) \times LONGFT_i \times SHRTFT_i}{AF_{ratio} \times \rho_{fuel} \times 1000 \text{ ml/l}} \times \Delta t_i$$

In equation (4), the $SHRTFT_i$ and $LONGFT_i$ are numerical multipliers, where a value of 1.0 represents no correction in either the fuel-lean or fuel-rich direction.

Scan tools usually represent fuel trim values as percentages. Fuel trim values can numerically range between −100% (lean) and +99.22% (rich), corresponding to multipliers of 0.0 (lean) and 1.9922 (rich), respectively. The long and short term fuel trim values have limits at which they are considered to be "out-of-range". For example, an auto manufacturer might use LONGFT≧25% and SHRTFT≧5% for one out-of-range limit condition for a given make/model/year of vehicle. When the out-of-range fuel trim condition is reached, the malfunction indicator lamp (MIL) is turned on and an OBDII diagnostic trouble code (DTC) is generated by the PCM.

Up to this point in the discussion, it has been assumed that the vehicle only supports one set of short/long-term fuel trim values. For many vehicles, this is indeed the case.

However, an OBDII equipped vehicle can support up to four (4) pairs or banks of short/long-term fuel trim values, as defined in the SAE J1979 specification. The number of pairs of short/long-term fuel trim values that are supported on a vehicle can be determined by requesting a list of supported PIDs, as defined in SAE J1979 (see service $01). The following PIDs (defined in SAE J1979), shown in Table 1, can be queried via OBDII to obtain fuel trim data, if they are supported on a vehicle:

TABLE 1

Long and short term fuel trim PIDs, as defined in SAE J1979.

| PID (hexadecimal) | Definition |
|---|---|
| 06 | Short term fuel trim bank 1, short term fuel trim bank 3 |
| 07 | Long term fuel trim bank 1, long term fuel trim bank 3 |
| 08 | Short term fuel trim bank 2, short term fuel trim bank 4 |
| 09 | Long term fuel trim bank 2, long term fuel trim bank 4 |

In the general case, the number of banks of fuel trim values ($n_{trim}$) that can be supported in a MAF-equipped vehicle is $1 \leq n_{trim} \leq 4$. If more than one bank (i.e. a pair) of short/long term fuel trim values is supported in a vehicle, then the average of the long term trim values and the average of the short term fuel trim values are computed and used in equation (4), i.e.

$$FC(\Delta T) = \sum_{i=1}^{N} FC(t_i) \quad (5)$$

$$= \sum_{i=1}^{N} \frac{MAF(t_i) \times \overline{LONGFT_i} \times \overline{SHRTFT_i}}{AF_{ratio} \times \rho_{fuel} \times 1000 \text{ ml/l} \times} \times \Delta t_i$$

$$= \frac{1}{AF_{ratio} \times \rho_{fuel} \times 1000 \text{ ml/l}} \sum_{i=1}^{N} \left( \begin{array}{c} MAF(t_i) \times \\ \overline{LONGFT_i} \times \\ \overline{SHRTFT_i} \times \Delta t_i \end{array} \right)$$

where $$\overline{LONGFT} = \frac{1}{n_{trim}} \sum_{j=1}^{n_{trim}} LONGFT_j$$

and $$\overline{SHRTFT} = \frac{1}{n_{trim}} \sum_{j=1}^{n_{trim}} SHRTFT_j$$

Thus, equation (5) provides a foundation for determining fuel consumption and fuel efficiency in vehicles for in-vehicle calculation of fuel consumption.

Implementation of the Method for Determining Fuel Consumption and Fuel Efficiency in a Vehicle Based on MAF Data In the preferred embodiment of the method for determining fuel consumption and fuel efficiency in a vehicle based on MAF data using the above noted equation (5), the entire fuel consumption calculation is performed within the VIU, with certain multiplications being optionally performed at the OverVIU as will be described in detail below. Time $t_0$ is defined as the time when the engine is started in a vehicle and time $t_N$ is the subsequent time that the engine is turned off. The time $t_0$ to $t_N$ is defined as a single vehicle "trip". The VIU calculates the fuel consumed during each trip and adds it to the Total Fuel Consumed (TFC) variable, stored in non-volatile memory within the VIU. The TFC, therefore, contains a record of the total fuel consumed by the vehicle since the VIU was installed in the vehicle.

It should be noted that the number of samples "N", in equation (5), is not known at the beginning of each trip. The calculation illustrated in equation (5) is performed "on-the-fly" as each data set obtained for each $t_i$. After each sample set is obtained, it can be discarded immediately after the summation is performed. This methodology is the preferred implementation. The alternative approach is to wait until all N sets of data samples have been obtained by the VIU and then compute FC($\Delta T$). This is inefficient, as it requires significant data storage capability within the VIU.

The TFC is zeroed automatically when the VIU is first installed in a vehicle, or at a time at which a command is sent (via a wireless connection) from the OverVIU to reset the value to zero. The TFC is an ongoing "running" total and is periodically saved in the VIUs datapoint memory (for later transmission to the OverVIU central database), along with the current date/time and odometer value. The trigger event for saving the data in non-volatile storage in the VIU is user configurable (at the OverVIU level, which is downloaded to the VIU with other configuration data) and can be based upon incremental fuel consumption (e.g. on a 0.1 litre change in fuel consumed) or elapsed engine operating time (e.g. fuel consumption is saved once a minute). In all cases, the fuel consumption data is written to non-volatile data storage within the VIU at the time of engine turn-off, so as to permit capturing the fuel consumed during a single trip.

The VIU can be configured to collect MAF data at a sampling rate up to that which is limited by the ability of the OBDII system to respond to data requests.

The configuration data is generated on the OverVIU and is downloaded wirelessly to the VIU via the VIUPoint.

In addition to MAF, the VIU typically has to acquire other vehicle parameters in real-time, which are also of interest to the end-user (e.g. fleet manager). The data sampling rate of MAF is a compromise between the desire to obtain MAF at the highest possible rate (to ensure the accuracy of the method) and the need to sample other vehicle OBDII data. The VIU is typically configured to capture MAF samples at a maximum rate of twice per second, without adversely affecting the overall accuracy of the method. For legacy OBDII protocols, including J1850 VPW, J1850 PWM, KWP2000 and ISO 9141-2, the maximum data polling rates are in the range of 5-15 data samples per second in normal application.

FIG. 1, which will be described in detail below, is common to both the MAF and MAP methods of determining fuel consumption and fuel efficiency in a vehicle. It encompasses the process of discovery of MAF or MAP support after vehicle ignition start and the discovery and initialization of other fuel-related parameters. If the VIU has been newly installed in a vehicle, it must perform a full automatic, i.e. smart discovery and initialization of fuel-related parameters, as the VIU has no pre-configured information about the vehicle.

If the VIU has already collected information from a vehicle from previous driving usage, then the VIU does not have to repeat the auto-discovery process of any parameters related to fuel consumption, as they are simply recalled from non-volatile variable storage within the VIU.

If the VIU has experienced a power interruption (the OBDII port is always powered, even when the vehicle is OFF), then upon a vehicle ignition start, the VIU must determine if it is installed in the same vehicle (for example, the VIU might have been removed for maintenance work and then plugged back into the OBDII port) or a different vehicle.

To determine if the VIU has been re-installed in the same vehicle, the VIU requests the Vehicle Identification Number (VIN) via OBDII. If the OBDII system in the vehicle supports VIN, then the VIU can easily make the determination if it is in the same vehicle by comparison of the current VIN with the previously stored VIN. If VIN is not supported, then the VIU must assume that it has been installed in a new vehicle.

It should be noted that in all of the flowcharts, a distinction is made between two types of non-volatile memory (NVM) data storage. If a quantity is stored in NVM, it is variable or parameter storage. This quantity is retained by the VIU for future use. The second type of NVM is datapoint storage. This type of storage is temporary in nature; it is a repository for vehicle data (including fuel consumption data) that the VIU collects. This data will eventually be uploaded wirelessly to the VIUPoint/OverVIU for further analysis and report generation.

Determining MAF/MAP Support in a Vehicle, Including Vehicle Start-Up and Initialization for the Method for Determining Fuel Consumption and Fuel Efficiency in a Vehicle FIG. 1 illustrates a method for determining MAF/MAP support in a vehicle, including vehicle start-up and initialization of the method for determining fuel consumption and fuel efficiency in a vehicle.

Step 1.

In step 1, the VIU detects a vehicle engine start.

Step 2.

When a vehicle ignition event is detected, the VIU determines if it is a) in the same vehicle as for previous trips (a trip being defined as the time between an engine on event to an engine off event), which is defined as a previously existing OBDII connection; or b) newly installed in a different vehicle.

If the VIU has been used before to collect data from a vehicle and has not been powered off, then it is in the same vehicle. If the VIU was newly installed in a vehicle or has experienced a power off-on event, then it must assume that it could be a new OBDII connection.

Step 3.

If the VIU is in the same vehicle (exit "N" from step 2), the VIU can recall the OBDII protocol from Non-Volatile Memory (NVM).

Step 4.

From previous OBDII monitoring of the vehicle, the VIU has previously determined if the vehicle supports either MAF or MAP, or both. The VIU recalls this information from NVM.

Step 5.

From previous usage in the vehicle, the VIU has previously determined how many banks of long term and short term fuel trim are supported within the vehicle. The VIU recalls this information from NVM.

Step 6.

If MAF is supported within a vehicle (exit "Y" from step 6 leading to step 19), use the MAF fuel consumption method (step 19 to be described in detail below with regard to FIG. 2). If MAF and MAP are supported within a vehicle, use the MAF fuel consumption method. If only MAP is supported in a vehicle (exit "N" from step 6 leading to step 18), use the MAP fuel consumption method (step 18 to be described in detail below with regard to FIG. 3).

Step 7.

Since the VIU could be in a new vehicle (exit "Y" from step 2), the OBDII communication protocol has to be determined. The VIU determines the OBDII protocol in use on the vehicle by cycling through the possible OBDII protocols according to SAE J1979, which include J1850 VPW, J1850 PWM, ISO 9141-2, KWP2000 and CAN.

Step 8.

The OBDII protocol is stored in NVM for future use in subsequent vehicle trips, to avoid repeating the protocol discovery process.

Step 9.

The VIU determined if the vehicle's identification number (VIN) is supported. This is a standard OBDII data request, as specified in SAE J1979. It may or may not be supported in an OBDII-equipped vehicle, depending upon the make, model and model year.

Step 10.

If VIN is supported (exit "Y" from step 9), acquire the VIN of the vehicle via OBDII.

Step 11.

Compare the VIN acquired with that stored in NVM. The VIN in NVM could be an actual VIN or the VIN could be blank. The VIN could be blank if the VIU is new and freshly installed for the first time in a vehicle or the VIU was previously installed and used in a vehicle where the OBDII system did not support VIN. A match of the saved VIN with the newly acquired VIN verifies that the VIU is installed in the same vehicle (exit "Y" from step 11 leading to step 4).

Step 12.

If the saved VIN and the newly acquired VIN differ (exit "N" from step 11), then the VIU must be installed in a different "new" vehicle The old VIN in NVM is deleted. The newly acquired VIN is saved in NVM.

Step 13.

Fuel consumption parameters are zeroed in NVM, such as the Total Fuel Consumed (TFC) and distance travelled.

Step 14.

Via OBDII data requests defined in SAE J1979, determine if MAF, MAP or both MAF & MAP are supported on the vehicle.

Step 15.

Save the MAF/MAP support information in NVM, so that the information can be re-used for subsequent vehicle trips.

Step 16.

Via OBDII data requests defined in SAE J1979, determine how many banks (pairs) of long term and short term fuel trim are supported.

Step 17.

Save the long term and short term fuel trim support in NVM, so that the information can be re-used for subsequent vehicle trips, and continue to step 6.

Thus, a method for determining MAF/MAP support in a vehicle, including vehicle start-up and initialization has been provided.

Figure 2:
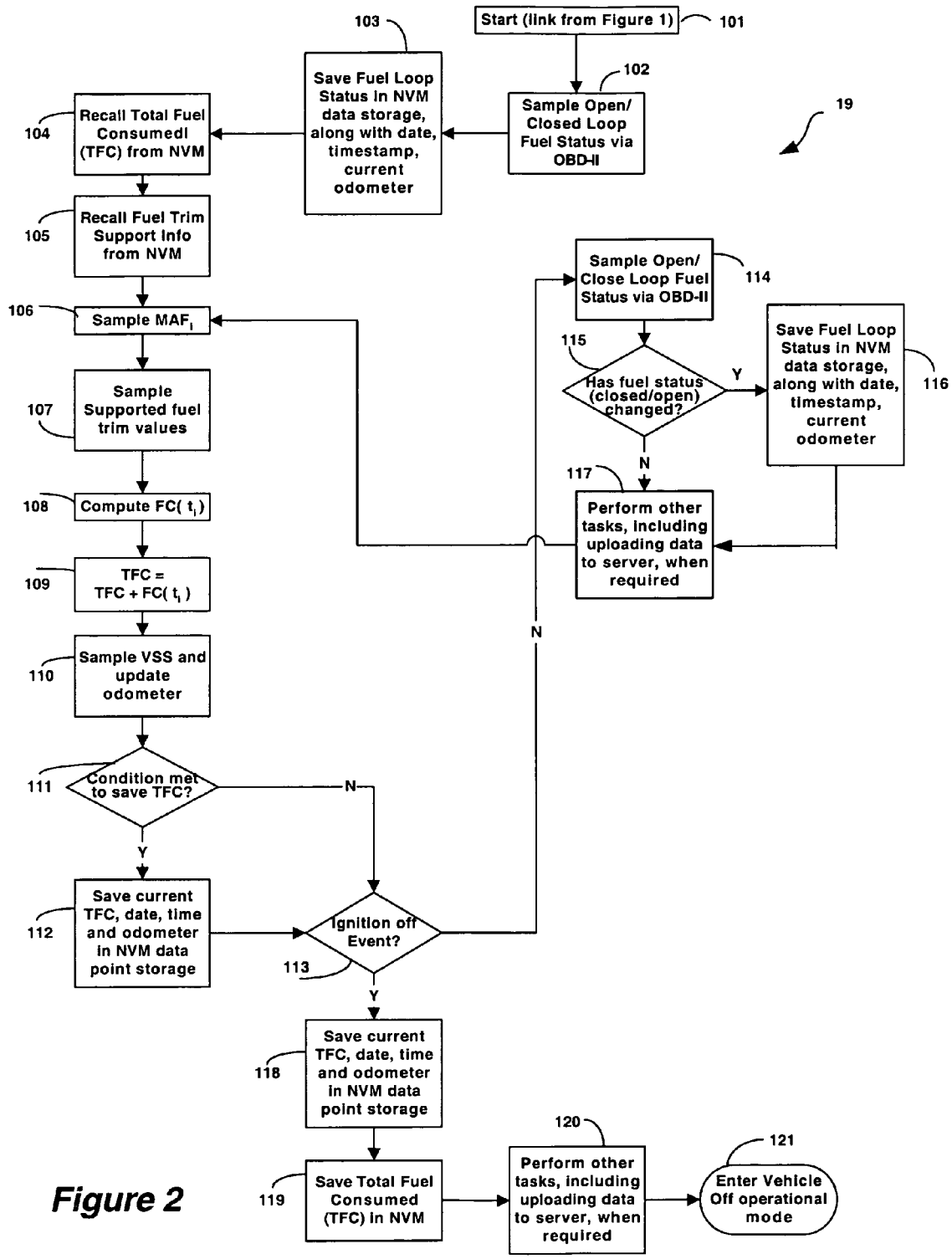
FIG. 2 shows the step 19 of FIG. 1 in more detail, illustrating a method for determining fuel consumption and fuel efficiency in a vehicle based on MAF data.

Steps of the Method for Determining Fuel Consumption and Fuel Efficiency in a Vehicle Based on MAF Data FIG. 2 shows a flowchart 19 illustrating the step 19 of FIG. 1 in more detail, including a method for determining fuel consumption and fuel efficiency in a vehicle based on MAF data obtained through the OBDII port.

Step 101.

This is an entry point from step 19 of Vehicle Start-up/ Initialization method of FIG. 1.

Step 102.

Sample the Fuel System Status (i.e. open or closed loop status) via standard SAE J1979 data request.

Step 103.

Save Fuel System Status (open/closed loop operation), current odometer, date/time in NVM datapoint storage.

Step 104.

Recall Total Fuel Consumed from NVM.

Step 105.

Recall Fuel Trim Support info (i.e. number of banks of long and short fuel trim supported) from NVM.

Step 106.

Sample $MAF_i$ using standard OBDII data request according to SAE J1979.

Step 107.

Sample the supported long and short term fuel trim data pairs and determine the average value of $LONGFT_i$ and $SHRTFT_i$.

Step 108.

Compute $FC(t_i)$ in accordance with equation (5).

Step 109.

Compute the Total Fuel Consumed by the vehicle.

Step 110.

Sample VSS and update odometer (distance travelled), e.g. odo distance (km)=odo distance (km)+VSS (km/hr)*3600 sec/hr*$\Delta t_i$ (sec)

Step 111.

The VIU has a configurable condition for storing fuel consumption data in NVM datapoint storage for further uploading to the OverVIU. The default condition for storing the fuel consumption data is a delta change, i.e. increase, in fuel consumed of 0.1 litres. The condition for triggering the storage of fuel consumption could also be a different parameter, such as time (e.g. every 10 seconds) or distance travelled (e.g. every km travelled). Thus, step 111 verifies if the condition for storing the data has been met. If Yes (exit "Y" from step 111), the flowchart 19 proceeds to step 112. If No (exit "N" from 111), the flowchart 19 proceeds to step 113.

Step 112.

The total fuel consumed, odometer and date time are stored in NVM datapoint storage.

Step 113.

Did the VIU detect an ignition (i.e. engine) off event? If Yes (exit "Y" from step 113), the flowchart 18 proceeds to step 118. If No (exit "N" from step 113), the flowchart 18 proceeds to step 114.

Step 114.

Sample the Fuel System Status (i.e. open or closed loop status) via standard SAE J1979 data request.

Step 115.

Has Fuel System status changed since last sample? If Yes (exit "Y" from step 115), the flowchart 18 proceeds to step 116. If No (exit "N" from step 115), the flowchart 18 proceeds to step 117.

Step 116.

Save Fuel System Status (open/closed loop operation), current odometer, date/time in NVM datapoint storage and proceed to step 117.

Step 117.

Other OBDII data sampling and VIU operational functions are performed here, including uploading data to server when required, and returning to step 106 described above.

Step 118.

If Ignition off event has been detected (exit "Y" from step 113), the total fuel consumed, odometer, data and time are stored in NVM datapoint storage.

Step 119.

Save total fuel consumed and current odometer in NVM, for subsequent recall at beginning of next trip.

Step 120.

Perform other VIU tasks required at ignition off, including uploading data to server when required.

Step 121.

Enter vehicle off operational mode (e.g. enter low-power mode, wait for vehicle ignition ON event).

Thus, a method for determining fuel consumption and fuel efficiency in a vehicle based on MAF data has been provided.

Validation of the Method for Determining Fuel Consumption and Fuel Efficiency in a Vehicle Based on MAF Data The validity of the MAF fuel consumption method was verified via dynamometer testing at a nationally certified emissions testing laboratory. The vehicle tested was a MAF-equipped 6 cylinder, 2002 Chevrolet Malibu, which is used as a lab test standard vehicle.

The fuel consumed was accurately measured using laboratory exhaust gas analysis. The analysis determines the amount of carbon in the exhaust gases, which can be used to very accurately calculate the amount of fuel consumed. The fuel used in the vehicle was regular unleaded gasoline with a density of 0.742 g/ml.

The vehicle test protocol used, which defines how the vehicle is operated (e.g. speed versus time) while under test, was the US06 Supplemental Federal Test Procedure as illustrated, e.g. in the reference Emission Test Cycles (SFTP-US06) published at "www.dieselnet.com/standards/cycles/ftp_us06.html" by DieselNet in April 2000. The cycle represents an 8.01 mile (12.8 km) route with an average speed of 48.4 miles/h (77.9 km/h), maximum speed 80.3 miles/h (129.2 km/h), and a duration of 596 seconds.

Results of the dynamometer testing of the MAF-based fuel consumption method are shown in Table 1, for the US06 drive cycle. Two versions of the MAF-based fuel consumption method were run simultaneously on the VIU, in order to assess the impact of fuel trim corrections on the computed fuel consumption. One method had the fuel trim correction factors set to unity (i.e. no trim correction factors were used), and the other method used the actual fuel trim values.

As can be seen from the test data in Table 1, the results of the method for determining fuel consumption based on MAF data without fuel trim value were within 2.91% of the laboratory measured values. When the fuel trim values were included in the method, the error was reduced to only −0.56%. The test data not only verifies the performance of the method for determining fuel consumption based on MAF data, but demonstrates that fuel trim values play an important role in improving the accuracy of the method.

Figure 3:
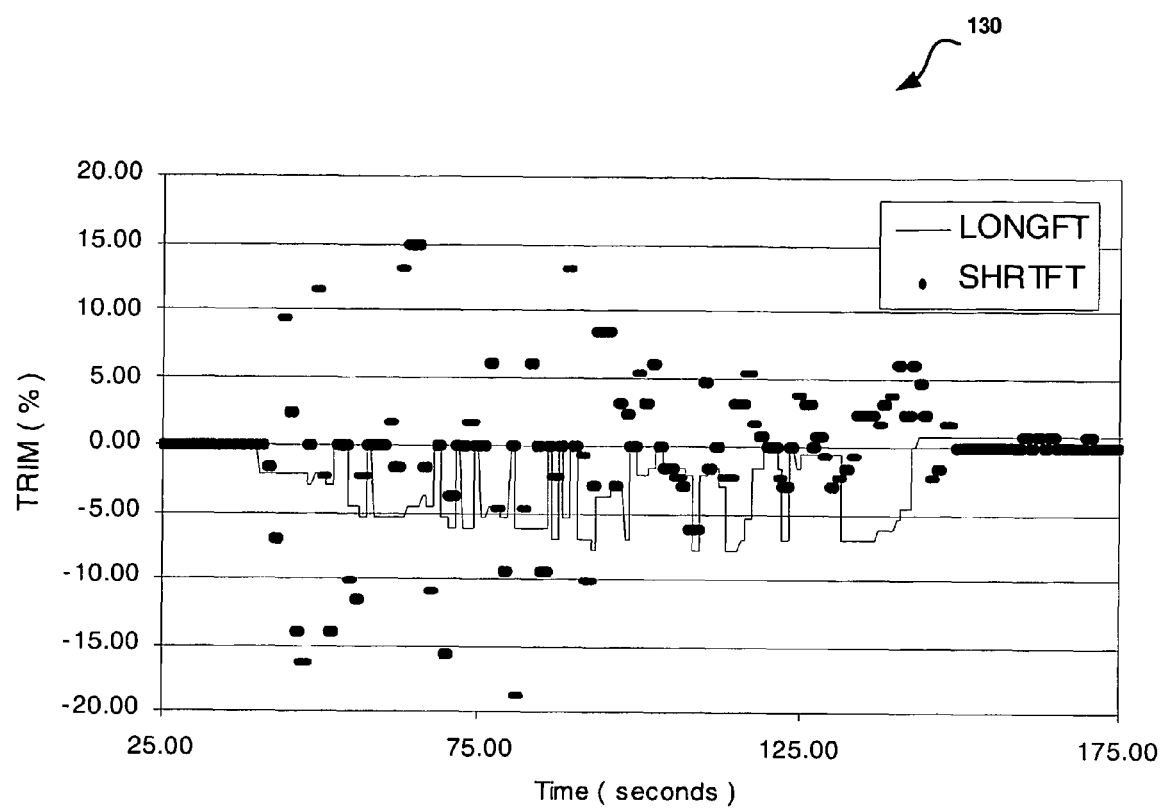
FIG. 3 shows a graph illustrating a short time-sequence of the long (LONGFT) and short-term fuel trim (SHRTFT) versus time, taken during the dynamometer testing.

An illustration of the rapid fluctuation in long and short term fuel trim data (i.e. LONGFT and SHRTFT, respectively) is shown in the graph 130 of FIG. 3. FIG. 3 illustrates a short time sequence of both LONGFT and SHRTFT data, obtained during the dynamometer testing for fuel consumption, the results of which are presented in Table 1. The graph of FIG. 3 clearly demonstrates that SHRTFT is changing much more rapidly than LONGFT. At certain sampling times, SHRTFT can be seen to result in an instantaneous fuel consumption multiplicative correction factor of more than ±5%. When the LONGFT is also applied for some of these same data points, the magnitude of the resulting SHRTFT×LONGFT instantaneous fuel consumption correction factor is even greater than that of SHRTFT alone.

TABLE 1

Laboratory results verifying MAF-based method for determining fuel consumption in a vehicle

| | Measured Fuel Economy Litres/100 km | Error (%) |
|---|---|---|
| Lab Result | 8.76 | — |
| MAF algorithm without fuel-trim correction | 8.51 | −2.91% |
| MAF method with fuel-trim correction | 8.71 | −0.56% |

Second Embodiment of the Invention

In MAP-equipped vehicles, the Mass Airflow (MAF) can be numerically approximated using MAP and other engine parameters as follows.

The MAP sensor is used by the ECU in determining the amount of air being 'consumed' by the engine and hence the amount of fuel to be delivered. As the name implies, this sensor generates an analog voltage monitored by the ECU that is proportional to the air pressure generated by air flowing into the intake air manifold, in units of kPa (kilopascals). The calculation by the ECU of fuel flow to the engine using MAP data is known as the speed-density method.

The following derivation illustrates what OBD-II engine parameters, along with MAP data, need to be used to determine fuel delivery to the engine. First, the ideal gas law has to be considered.

The ideal gas law gives the relationship between the pressure, volume and temperature of a given number of moles of a gas, i.e.

$$PV = nRT \tag{A1}$$

where
- P=pressure of the gas (usually in atmospheres)
- V=volume of the gas (in litres)
- n=number of moles of gas
- R=the ideal gas constant
- R=8.314 kPa K$^{-1}$ mol$^{-1}$ if pressure is in kilopascals (kPa), volume is in litres (l), temperature is in degrees Kelvin (K)
- R=0.0821 L atm K$^{-1}$ mol$^{-1}$ if pressure is in atmospheres (atm), volume is in litres (l), temperature is in degrees Kelvin (K)
- T=temperature of the gas (in degrees Kelvin)

Using equation (A1) and solving for "n", the number of moles of air $$n = \frac{PV}{RT} \tag{A2}$$

The mass of air flowing into all the cylinders of the engine ($m_{air}$) is related to the number of moles of air (n) by $$m_{air} = nM_{air} \tag{A3}$$

where $M_{air}$ is the molar mass of air, in grams/mole.

Combining equations (A2) and (A3) and solving for the mass of air flowing into all of the engine's cylinders, $$m_{air} = nM_{air} = \frac{PV}{RT}M_{air} \tag{A4}$$

In equation (A4), the volume (V) is the engine displacement. The engine displacement is designated 'ED'. The pressure (P) is calculated from $$P = VE \times MAP \tag{A5}$$

where VE is the volumetric efficiency (VE). The volumetric efficiency (expressed as a percentage) in a cylinder (or engine) is defined as the pressure in the cylinder at BDC (Bottom Dead Centre) relative to pressure at ambient. In simpler terms, the VE is a measurement of how close the actual volumetric flow rate is to the theoretical volumetric flow rate. An engine has a fixed volume (displacement) that can be calculated. In most cases, the engine cannot make use of the full volume (100%) of air contained within the cylinder because of friction losses, hose leaks etc. For turbocharged or other high-performance engines, the VE can exceed unity.

The air temperature used in equation (A4) is the intake (manifold) air temperature, or IAT, which is usually extracted (via OBD-II) in units of degrees Celsius. To convert from degrees C to degrees K, the following conversion formula is used $$IAT(K) = IAT(C) + 273.12 \approx IAT(C) + 273 \tag{A6}$$

Substituting equations (A5) and (A6) into equation (A3) yields $$m_{air} = \frac{VE \ast MAP \ast ED}{R \ast (IAT + 273.12)} M_{air} \tag{A7}$$

In equation (A7), both R and $M_{air}$ are physical constants. VE and ED are constants for a given engine type.

The rate of air entering the engine per unit time is dependent upon the engine's RPM. In a 4 stroke engine, 720 degrees of crankshaft rotation (i.e. two revolutions) is required for a full stroke. This means that if an engine is operating at 'x' RPM, the actual number of times per minute that each cylinder in the engine is filled with air is x/2. Thus, the mass air flow (or MAF, in units of grams/second) into the engine (all cylinders) is given by $$MAF \ (g/s) = \frac{RPM}{2 \times 60} m_{air} \tag{6}$$

$$= \frac{RPM \times VE \times MAP \times ED}{120 \times R \times (IAT + 273.12)} M_{air}$$

Now that MAF has been derived from MAP, it is possible to calculate the rate of fuel consumption, in units of litres/second in accordance with equation (6), where RPM=engine RPM (min$^{-1}$)

VE=Volumetric Efficiency (unitless number, usually expressed as a percentage)

MAP=Manifold Air Pressure (kPa)

ED=Engine Displacement (litres)

R=ideal gas constant 8.314 kPa K$^{-1}$ mol$^{-1}$

IAT=Intake (manifold) Air Temperature (degrees Celsius)

$M_{air}$=molar mass of air (g/mol)=28.97 g/mol

In equation (6), the factor of 120 in the denominator arises from the conversion of RPM into revolutions per second and the fact that in a 4 stroke engine, fuel is consumed in only 2 of the 4 cycles.

In order to determine MAF, the following parameters have to be sampled via OBDII; MAP, IAT and RPM. VE and ED are engine dependent. Generally, these two parameters cannot be determined via non-proprietary OBDII data queries. For normally-aspirated engines, $VE \leq 1$.

Combining equations (1) and (6), the instantaneous fuel consumption rate (litres per second) can be expressed in terms of the measurable quantities MAP, IAT and RPM:

$$\text{Fuel Rate (l/s)} = \frac{RPM \times VE \times MAP \times ED \times M_{air}}{120 \times R \times (IAT + 273.12) \times AF_{ratio} \times \rho_{fuel} \times 1000 \text{ ml/l}} \quad (7)$$

The parameters VE and ED cannot be determined directly via OBDII interrogation and are dependent upon the make/model/year of vehicle. The term ED is a constant for a given vehicle and VE is essentially a constant, although small variations in the VE can occur depending on engine operating conditions. Both ED and VE are considered constant values for the purpose of the calculation of fuel consumption for a given vehicle. R is a numerical physical constant and the fuel density is assumed to be a constant value for a given fuel grade.

Once the fuel consumption rate is known, it can be integrated with respect to time to determine the fuel used in a given time interval $\Delta T$. This is similar to the methodology used for MAF-based fuel calculation. For a sampled data system, the integration is carried out numerically, using discrete data samples. If there are N sample sets of OBDII fuel parameters (in equation (7)) obtained in the time interval $\Delta T$, then the Fuel Consumed (in litres) during $\Delta T$ is given by $$FC(\Delta T) = \sum_{i=1}^{N} FC(t_i) = \sum_{i=1}^{N} \text{fuel rate}(t_i) \times \Delta t_i \quad (8)$$

where, $\Delta t_i = t_i - t_{i-1}$ (seconds)

$t_0$=engine start time at the beginning of a single vehicle trip $t_N$=subsequent engine stop time at the end of a single vehicle trip $FC(t_i)$=fuel consumption rate (litres/s) sampled and computed at time $t_i$ fuel rate$(t_i)$=Fuel flow rate (l/s) calculated at time $t_i$

Sampling Data from OBDII Port

A rigorous mathematical application of equation (8) requires that MAP, RPM and IAT be sampled coincidentally. Unfortunately, this is not always possible for the following reasons.

Many OBDII diagnostic ports use so called legacy OBDII protocols (such as J1850 VPW, J1850 PWM, ISO 9141-2 and KWP2000), which are relatively slow serial protocols, ranging up to 41.6 kilobits per second. Some of the slower legacy OBDII protocol implementations can provide, at most about 5 data items per second. This means that the acquisition of IAT, MAP and RPM on a per-second basis would result in the VIU not being able to obtain any other data, as VSS is sampled at least twice per second in the VIU.

Some newer OBDII diagnostic ports in CAN-equipped OBDII vehicles use CAN OBDII protocol, which supports queries containing 6 parameters in a single request. The CAN1 data rates are much higher than for legacy OBDII protocols, which can result in significantly higher data sampling rates.

Therefore the achievable scenario for sampling MAP, RPM and IAT in legacy OBDII vehicles, is to sample these parameters sequentially or according to a predetermined sampling pattern, and to associate them with a single sample interval. For CAN OBDII equipped vehicles, MAP, RPM and IAT can be obtained in a single OBDII request and these values can be associated with the same sample interval.

During the operation of a motor vehicle, IAT generally varies slowly when compared with either MAP or RPM. It is likely sufficient to sample IAT every 30 seconds and to assume that it remains constant over that time period. It is considered sufficient to sample RPM and MAP more frequently, e.g. every 2 seconds, as there parameters change at a higher rate. In general, the sampling time interval for a given parameter to be sampled through the OBDII port, is chosen to be substantially inversely proportional to the rate of change of the parameter. In other words, the frequency of sampling a given parameter to be sampled through the OBDII port, is chosen to be substantially proportional to the rate of change of the parameter, which may be determined through immediate previous measurements of the parameter or previous historic data.

If MAP and RPM are sampled sequentially, in equation (8), the sample time $t_i$ can be associated with the sample time of MAP. Equations (8) and (7) can be combined to yield $$FC(\Delta T) = \sum_{i=1}^{N} \frac{RPM_i \times VE \times MAP_i \times ED \times M_{air}}{120 \times R \times (IAT_i + 273.12) \times AF_{ratio} \times \rho_{fuel} \times 1000 \text{ ml/l}} \Delta t_i \quad (9)$$

$$= \frac{VE \times ED \times M_{air}}{120 \times R \times AF_{ratio} \times \rho_{fuel} \times 1000 \text{ ml/l}}$$

$$\sum_{i=1}^{N} \frac{RPM_i \times MAP_i}{(IAT_i + 273.12)} \Delta t_i$$

As in the case of the MAF based method, the MAP based method for determining fuel consumption can also be extended to include long and short-term fuel trim values, i.e.

$$FC(\Delta T) = \sum_{i=1}^{N} FC(t_i) \quad (10)$$

$$= \frac{VE \times ED \times M_{air}}{120 \times R \times AF_{ratio} \times \rho_{fuel} \times 1000 \text{ ml/l}} \times$$

$$\sum_{i=1}^{N} \frac{RPM_i \times MAP_i \times \overline{LONGFT_i} \times \overline{SHRTFT_i}}{(IAT_i + 273.12)} \Delta t_i$$

$$= \frac{VE \times ED \times M_{air}}{120 \times R \times AF_{ratio} \times \rho_{fuel} \times 1000 \text{ ml/l}}$$

$$\sum_{i=1}^{N} \frac{RPM_i \times MAP_i \times \overline{LONGFT_i} \times \overline{SHRTFT_i}}{(IAT_i + 273.12)} \Delta t_i$$

Thus, equation (10) provides a mathematical foundation for determining fuel consumption that is implemented in the VIU.

The terms $RPM_i$, $MAP_i$ and $IAT_i$ are not sampled simultaneously, unless the CAN OBDII protocol is used. Preferably, MAP and RPM are sampled consecutively, at a rate of once or twice per second. IAT is sampled less frequently, such as every 10 to 30 seconds, as it is usually a slowly-varying quantity.

Various sampling patterns for sampling various data can be used, for example sensing of MAP, RPM and IAT may be performed in one or more of the following ways: sensing MAP and RPM at substantially same frequency, and sensing IAT at a lower frequency; sensing MAP, RPM and IAT data at respective frequencies, which are substantially inversely proportional to the rates change of respective data; sensing MAP and RPM consecutively; sensing MAP and RPM concurrently; sensing MAP and RPM according to a random selection of their sampling order; or sensing IAT at a sampling frequency, which is dependent on the value of RPM.

Alternatively, sampling of various vehicle's data can be done at respective various sampling frequencies, which are based on historic data for the respective vehicle's data.

Determining an Effective VE (Volumetric Efficiency) from Actual Fuel Data

In the equations (9) and (10) shown above, with the exception of the Volumetric Efficiency (VE), all other parameters (constants and variables) are either known or can be acquired from the vehicle via OBDII queries.

Initially, it was assumed that VE for any vehicle type (make/model/year) could be readily obtained from OEMs. Unfortunately, this is not the case, and in practice, very little information is available from public sources on the typical value of VE for any vehicle.

To complicate matters further, VE is not constant and can vary slightly with engine operating conditions, such as RPM and engine load. This is a complex relationship that may be determined via dynamometer measurement. What is needed for the computation of fuel consumption is an effective VE (i.e. $VE_{eff}$) that represents "typical" driving conditions.

The value of $VE_{eff}$ can be determined via the VIU and OverVIU as follows.

Part of the process requires that the operator of a given vehicle record fuel and odometer data, during a number of consecutive vehicle refuelling stops. During each refuelling stop, the vehicle's gas tank must be completely filled. The data recorded is typically as shown in Table 2 shown below.

The fuelling data (odometer, litres of fuel, date and time) has to be entered into the OverVIU, either by manual or automated means. If a fleet uses an automated fuelling system, then it is possible that the required fuelling information can be imported electronically, in an automated fashion. The objective of gathering the data is to derive a fairly accurate estimate of fuel consumption (litres or gallons), for a given distance travelled. Preferably, more than one fuelling cycle is required to accurately estimate fuel consumed by a vehicle, because there can be significant variation (i.e. several litres) in the amount of fuel added to a gas tank before the fuel pump detects that the tank is full. If the fuel consumption calculation is repeated over multiple fill-ups, the error in the volume measurement decreases accordingly.

TABLE 2

Records of fuel consumed by a vehicle

| date | time | Odometer (km) | Total Distance Travelled (km) | Fuel (litres) | Total Fuel Used (litres) |
|---|---|---|---|---|---|
| 19, Dec. 2005 | 12:20 | 384.4 | | 33.100 | |
| 22, Dec. 2005 | 13:00 | 723.6 | 339.2 | 27.400 | 27.400 |
| 08, Jan. 2006 | 15:24 | 1177.8 | 793.4 | 37.274 | 64.674 |
| 11, Jan. 2006 | 21:08 | 1504.7 | 1120.3 | 25.030 | 89.704 |
| 13, Jan. 2006 | 15:38 | 1738.2 | 1353.8 | 15.647 | 105.351 |
| 16, Jan. 2006 | 21:27 | 2092.7 | 1708.3 | 27.310 | 132.661 |
| 22, Jan. 2006 | 10:54 | 2459.1 | 2074.7 | 28.930 | 161.591 |
| 27, Jan. 2006 | 8:27 | 2875.6 | 2491.2 | 31.100 | 192.691 |
| 01, Feb. 2006 | 21:18 | 3292.6 | 2908.2 | 30.000 | 222.691 |
| 06, Feb. 2006 | 18:23 | 3588.1 | 3203.7 | 22.380 | 245.071 |
| 10, Feb. 2006 | 8:24 | 3857.9 | 3473.5 | 22.800 | 267.871 |
| 13, Feb. 2006 | 8:24 | 4140.5 | 3756.1 | 22.700 | 290.571 |

As can be seen from Table 2, the summation of the consumed fuel begins at the second fill-up. The first fill-up servers as the start (i.e. the zero distance travelled reference point) of the distance travelled calculation until the next re-fuelling. From the beginning of the second fuelling to the last fuelling, the total fuel consumed (TFC) was 290.571 litres. The total fuel consumed by refuelling measurement is denoted $TFC_M$.

While the fuel data is being collected by the driver, the VIU has been calculated fuel consumption using VE=1. The OverVIU can extract the fuel consumption data (i.e. a running total) from the VIU data records, at the time of the $2^{nd}$ fuel fill-up and the last fuel fill-up. The total fuel consumed (TFC), calculated by the VIU in this time interval (denoted by $TFC_V$) is calculated by $$TFC_V = TFC_V(t_{end} - t_{start}) = TFC_V(t_{end}) - TFC_V(t_{start})$$

Where, $t_{start}$=the date/time of the $2^{nd}$ fuelling and
$t_{end}$=the date/time of the last fuelling In this example, the $TFC_V$=345.56 litres, as computed by the VIU for the identical time interval.

The effective VE can be computed from the fuel consumption data from the VIU and fuel data, for the same time interval, i.e. from our example:

$$VE_{eff} = \frac{TFC_M}{TFC_V} = \frac{290.571}{345.56} = 0.841$$

The application of the Volumetric Efficiency (VE) in the fuel consumption calculation can be done either by the OverVIU or by the VIU, i.e. it can be applied during or post real-time data acquisition of vehicle data, shown in equation (10).

Figure 4:
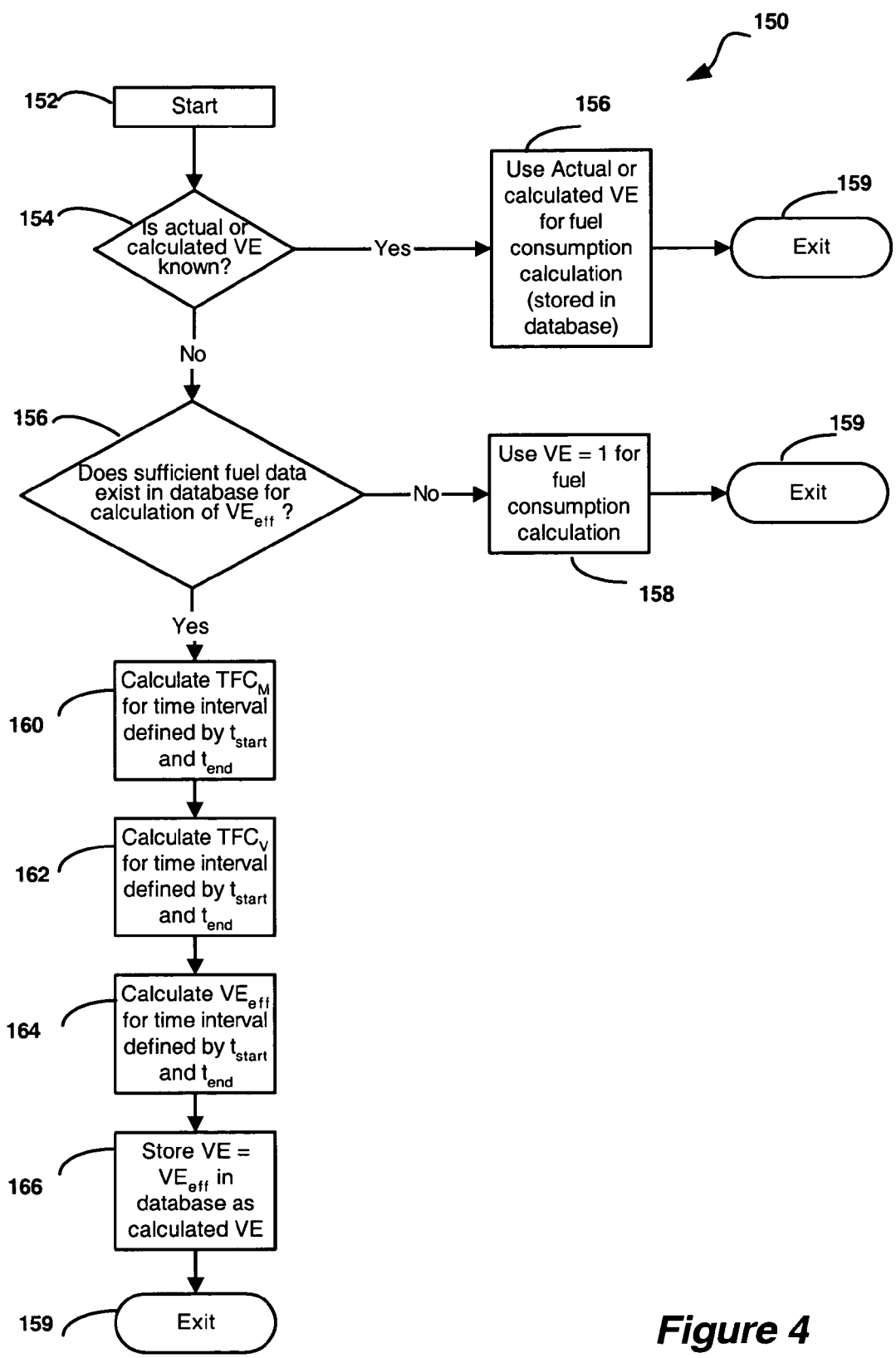
FIG. 4 illustrates a method for determining an effective volumetric efficiency of a vehicle's engine, the method being performed at a central host.

Flowchart 150 in FIG. 4 illustrates a method for determining an effective VE of a vehicle's engine in more detail. The method is executed on the OverVIU for each vehicle that is equipped with a VIU and for which fuel consumption data is to be monitored and computed. This method applies to the case where the OverVIU manages the application of VE (actual or computed) in the MAP-based fuel calculation. In this method, the VIU always uses a VE=1 in the calculation of fuel consumption.

When VIU data from a given vehicle is uploaded to the OverVIU, the OverVIU executes (at an appropriate time) the method of FIG. 4 in the analysis of new fuel consumption data. When a VIU is first installed in a vehicle, configuration information regarding the vehicle data and the VIU is entered into the database. At this time, if the actual VE for a vehicle is known (i.e. from the vehicle's manufacturer), it is entered into the database to replace the default value of VE. If an effective VE (i.e. $VE_{eff}$) is known, it can also be entered into the database as the value of VE. If neither of these quantities are known, then a default VE=1 is used.

The steps of the method shown in FIG. 4 are as follows.

Step 152: Start

Step 154: The database is interrogated to determine if the actual or calculated VE (i.e. $VE_{eff}$) is known. If either of these quantities is stored in the database (Exit "Yes" from step 154), then the OverVIU will use this value of VE for fuel consumption calculations (Step 156), and the method is terminated (Step 159).

At Step 154, if neither the actual VE, nor calculated VE is known (exit "No" from step 154), then the database is interrogated (Step 156) to see if enough fuel data has been acquired to permit the calculation of VE=$V_{eff}$. The basis for determining that adequate fuel data has been obtained may be the number of kilometers travelled, the total litres of fuel consumed, or other criteria.

If the database has insufficient fuel data to permit the calculation of $VE_{eff}$ (exit "No" from step 156), then the default value of VE=1 is used by the OverVIU for fuel consumption calculations (Step 158), followed by termination of the method (Step 159).

If the database has sufficient fuel data to permit the calculation of $VE_{eff}$ (exit "Yes" from step 156), then the OverVIU computes (Step 160) the total fuel consumed $TFC_M$, in the time interval defined by $t_{start}$ to $t_{end}$. The $TFC_M$ value is computed from actual odometer and fuel data (i.e. litres of fuel pumped) obtained at the time of re-fuelling, i.e. not collected by the VIU.

In a similar fashion, the total fuel consumed $TFC_V$ is calculated by the OverVIU (Step 162). The $TFC_V$ is based upon data collected by the VIU, during the time interval defined by $t_{start}$ to $t_{end}$. Please note that in this method the calculation of fuel consumed within the VIU, the volumetric efficiency is always set to unity.

Step 164: The OverVIU calculates the effective volumetric efficiency ($VE_{eff}$), as described above in the section "Determining an Effective VE (Volumetric Efficiency) from actual Fuel Data".

Step 166: The value of VE=$VE_{eff}$ is saved in the database. This value will now be used by the OverVIU for all future calculations of fuel consumption for this vehicle, and the method is terminated (Step 159).

Thus, an effective value of VE has been determined.

Figure 5:
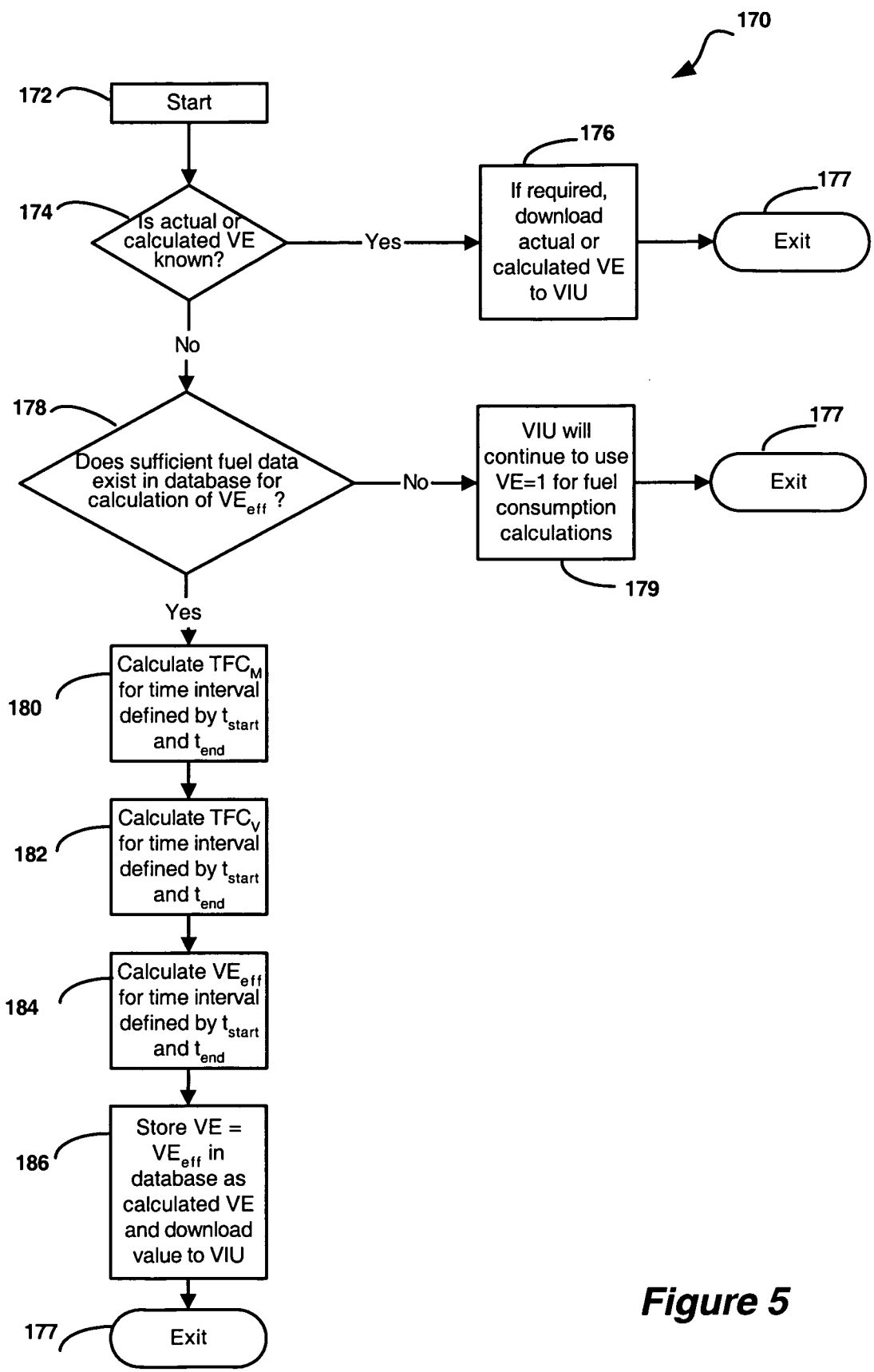
FIG. 5 illustrates an alternative method for determining an effective volumetric efficiency of a vehicle's engine, the method being performed in the vehicle.

Yet another method for determining an effective VE is illustrated by flowchart 170 in FIG. 5. It produces numerically identical results to the method of FIG. 4 described above, and the difference between the methods of FIGS. 4 and 5 is where the VE factor is applied in the fuel consumption calculation. In the method of FIG. 4, VE is applied by the OverVIU, while in the method of FIG. 5, VE is applied in the VIU, as data is collected in real time.

The method of FIG. 5 is executed on the OverVIU, for each vehicle that is equipped with a VIU and for which fuel consumption data is to be monitored and computed. It applies to the case where the OverVIU downloads the value of VE (actual or computed) to the VIU, once it is known. The VIU can then use this value of VE in the computation of fuel consumption. The VIU initially is configured with a default VE=1, until updated by the OverVIU.

When VIU data from a given vehicle is uploaded to the OverVIU, the OverVIU executes (at an appropriate time) the method of FIG. 5, during the processing of new fuel consumption data. When a VIU is first installed in a vehicle, configuration information regarding the vehicle data and the VIU is entered into the database. At this time, if the actual VE for a vehicle is known (i.e. from the vehicle's manufacturer), it is entered into the OverVIU's database as the value of VE and downloaded to the VIU as configuration information. If an effective VE (i.e. $VE_{eff}$) is known, it can also be entered into the database as the value of VE and downloaded to the VIU. If neither of these quantities are known, then a default VE=1 is used by the VIU.

The steps of the method shown in FIG. 5 are as follows.

Step 172: Start

Step 174: The database is interrogated to determine if the actual or calculated VE (i.e. $VE_{eff}$) is known. If either of these quantities is stored in the database (exit "Yes" from step 174), then if required, the OverVIU will download this value of VE to the VIU, for fuel consumption calculations (Step 176), followed by termination of the method (Step 177).

At Step 174, if neither the actual VE, nor calculated VE is known (exit "No" from step 174), then the database is interrogated (Step 178) to see if enough fuel data has been acquired to permit the calculation of VE=$V_{eff}$. The basis for determining if adequate fuel data has been obtained may be the number of kilometers travelled, the total litres of fuel consumed, or other criteria.

If the database has insufficient fuel data to permit the calculation of $VE_{eff}$ (exit "No" from step 174), then the default value of VE=1 is used by the OverVIU for fuel consumption calculations (Step 179), and the method is terminated (Step 177).

If the database has sufficient fuel data to permit the calculation of $VE_{eff}$ (exit "Yes" from step 178), then the total fuel consumed $TFC_M$ is computed (Step 180) by the OverVIU, for the time interval defined by $t_{start}$ to $t_{end}$. The $TFC_M$ is computed from actual odometer and fuelling data (i.e. litres of fuel delivered by the gas pump) obtained at the time of fuelling, i.e. not collected by the VIU.

In a similar fashion, the total fuel consumed $TFC_V$ is calculated by the OverVIU (Step 182). The $TFC_V$ is based upon data collected by the VIU, during the time interval defined by $t_{start}$ to $t_{end}$.

Step 184: The OverVIU calculates the effective volumetric efficiency ($VE_{eff}$), as described above in the section "Determining an Effective VE (Volumetric Efficiency) from actual Fuel Data".

Step 186: The value of VE=$VE_{eff}$ is saved in the database and downloaded to the VIU. This value will now be used by the VIU for all future calculations of fuel consumption for this vehicle, and the method is terminated (Step 177).

Thus, simple yet efficient methods of determining an effective VE for a vehicle have been provided.

Implementation of the Method for Determining Fuel Consumption and Fuel Efficiency in a Vehicle Based on MAP Data In the preferred implementation of the method based on equation (10) shown above, the summation part of the equation is performed within the VIU, while the combined multiplicative constant (composed of all the multiplicative terms to the left of the summation sign in equation (10)) can be applied either at VIU, or at the OverVIU.

In the latter case, it precludes the necessity of having to download vehicle-dependent parameters (e.g. VE and ED) to the VIU. It also affords the opportunity to have some parameters configurable on the OverVIU to perform fuel density corrections, and other data processing as may be required.

Both VE and ED are dependent upon the make/model/year of the vehicle. As described in the previous U.S. provisional patent applications Ser. No. 60/686,890 to Zoladek et al assigned to the same assignee, filed on Jun. 3, 2005 and entitled "VEHICLE IDENTIFICATION NUMBER EXTRACTION AND DECODING", and Ser. No. 60/693,286 to Zoladek et al filed on Jun. 24, 2005 entitled "VEHICLE IDENTIFICATION NUMBER EXTRACTION AND DECODING", both applications being incorporated herein by reference, the Vehicle Identification Number (VIN) can be automatically extracted from the vehicle (when supported) by the VIU and relayed to the OverVIU. The OverVIU can then decode the VIN to determine the make/model/year of the vehicle and the ED. The typical VE, obtained from the auto manufacturer, is also entered into the database, keyed to VIN-based vehicle identification data. The use of the VIN, therefore, can provide both ED and VE from the OverVIU's database. If VIN extraction is not supported by the OBDII system in a vehicle, then the VIN will have to be entered into the database on the OverVIU by manual or other semi-automated method (e.g. bar code scanning).

Once the OverVIU has the ED and VE data for a given vehicle, it could download it to the VIU, and a method for determining fuel consumption in accordance with equation (10) could be carried out completely within the VIU.

Alternatively, VE can be determined in accordance with the method of Determining an Effective VE (Volumetric Efficiency) from actual Fuel Data as described above.

Figure 6:
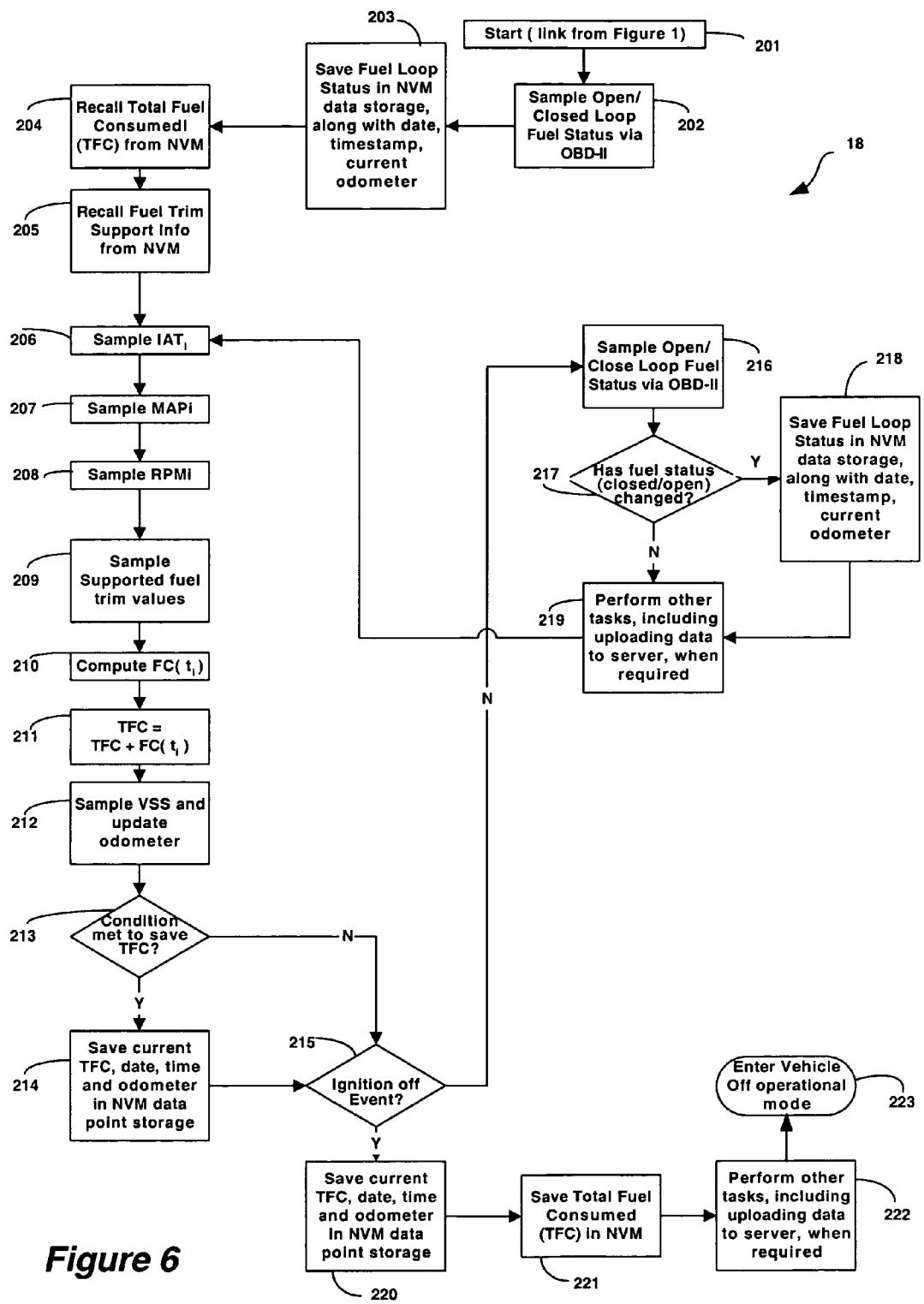
FIG. 6 shows the step 18 of FIG. 1 in more detail, illustrating a method for determining fuel consumption and fuel efficiency in a vehicle based on MAP data.

Steps of the Method for Determining Fuel Consumption and Fuel Efficiency in a Vehicle Based on MAP Data FIG. 6 shows a flowchart 18, illustrating the step 18 of FIG. 1 in more detail, including a method for determining fuel consumption in a vehicle based on MAP data obtained through the OBDII port.

Step 201.
Entry Point from step 18 of the Vehicle Start-up/Initialization flowchart of FIG. 1.

Step 202.
Sample the Fuel System Status, i.e. open or closed loop status, via standard SAE J1979 data request.

Step 203.
Save Fuel System Status (open or closed loop operation), current odometer, date/time in NVM datapoint storage.

Step 204.
Recall Total Fuel Consumed from NVM.

Step 205.
Recall Fuel Trim Support info, i.e. number of banks of long term and short term fuel trim, supported from NVM.

Step 206.
Sample $IAT_i$ using standard OBDII data request according to SAE J1979.

Step 207.
Sample $MAP_i$ using standard OBDII data request according to SAE J1979.

Step 208.
Sample $RPM_i$ using standard OBDII data request according to SAE J1979.

Step 209.
Sample the supported long term and short term fuel trim data pairs and calculate the average of $LONGFT_i$ and $SHRTFT_i$.

Step 210.
Compute $FC(t_i)$ in equation (10) shown above.

Step 211.
Compute the total fuel consumed (TFC) by the vehicle.

Step 212.
Sample VSS and update odometer (distance travelled), e.g. odo distance (km)=odo distance (km)+VSS (km/hr)*3600 sec/hr*$\Delta t_i$ (sec)

Step 213.
The VIU has a configurable condition for storing fuel consumption data in NVM datapoint storage for further uploading to the OverVIU. The default condition for storing the fuel consumption data is a delta change (i.e increase) in fuel consumed of 0.1 litres. The condition for triggering the storage of fuel consumption could also be a different parameter, such as time (e.g. every 10 seconds) or distance travelled (e.g. every km travelled). Step 213 verifies if the condition for storing the data has been met. If Yes (exit "Y" from step 213), the flowchart 18 proceeds to step 214. If No (exit "N" from step 213), the flowchart 18 proceeds to step 215.

Step 214.
The total fuel consumed, odometer and date time are stored in NVM datapoint storage.

Step 215.
Did the VIU detect an ignition (i.e. engine) off event? If Yes (exit "Y" from step 215), the flowchart 18 proceeds to step 220. If No (exit "N" from step 215), the flowchart 18 proceeds to step 216.

Step 216.
Sample the Fuel System Status (i.e. open or closed loop status) via standard SAE J1979 data request.

Step 217.
Has Fuel System status changed since last sample? If Yes (exit "Y" from step 217), the flowchart 18 proceeds to step 218. If No (exit "N" from step 217), the flowchart 18 proceeds to step 219.

Step 218.
Save Fuel System Status (open/closed loop operation), current odometer, and date/time in NVM datapoint storage.

Step 219.
Perform other OBDII data sampling and VIU operational functions, including uploading data to server when required.

Step 220.
If the "Ignition Off event" has been detected (exit "Y" from step 215), the total fuel consumed, odometer, data and time are stored in NVM datapoint storage in step 220.

Step 221.
Save total fuel consumed and current odometer in NVM, for subsequent recall at beginning of next trip.

Step 222.
Perform other VIU tasks required at ignition off event, including uploading data to server when required.

Step 223.
Enter vehicle off operational mode, e.g. enter low-power mode, wait for vehicle ignition ON event.

Thus, a method for determining fuel consumption in a vehicle based on MAF data has been provided.

Validation of the Method for Determining Fuel Consumption and Fuel Efficiency in a Vehicle Based on MAP Data The MAP fuel consumption method was validated using a MAP-equipped 2005 Dodge SX2.0. The vehicle was road driven for a distance of 506.9 km, over a combination of city and highway driving conditions. The fuel consumed by the vehicle was determined via careful measurement of the fuel quantities during fueling. During the test, the vehicle used 31.45 litres of regular gasoline having a measured density of 0.74 g/ml.

The 2005 Dodge SX2.0 used was equipped with a 2.0 litre, 4 cylinder engine and a 5-speed manual transmission. According to the literature, see e.g. John Lawlor, "The Auto Math Handbook", 1992, HPBooks, ISBN 1557880204, this type of engine, i.e. an ordinary low performance, normally aspirated, production engine, should have a typical volumetric efficiency of about 75% at maximum speed. By comparison, for a high-performance production engine, the VE≈80% at maximum speed.

TABLE 3

Road Test results for verifying the method for determining fuel consumption based on MAP data

|  | Measured Fuel Economy Litres/100 km | Error (%) |
|---|---|---|
| Road Test Value (measured) | 6.20 | — |
| MAP method using VE = 0.80 | 6.67 | 7.63% |
| MAP method using VE = 0.75 | 6.26 | 0.90% |

The test results, verifying the method for determining fuel consumption based on MAP data, are presented in Table 3. The road test value of fuel economy was derived from the measured fuel consumption and the vehicle's odometer value. The method for determining fuel consumption based on MAP data according to equation (11), using a VE=0.80, resulted in an error of ~7.6%, while the same method using a VE=0.75, yielded an error of ~0.90%. The latter value is applicable to the engine type found in a stock 2005 Dodge SX2.0.

The calculations ware performed with two different values of VE to demonstrate the sensitivity of the calculation to the anticipated range of VE's that would be encountered in typical production vehicles that are normally aspirated. Some variation in VE might be expected while operating a vehicle over normally expected RPM and load ranges.

An effective VE for a vehicle can be determined according to the method of determining an effective VE from actual fuel data as described above.

The fuel economy data presented in Table 3 verifies that the method for determining fuel consumption based on MAP data does yield accurate results for fuel consumption and fuel efficiency.

Fuel Consumption on Hybrid Electric Vehicles (HEVs)

The methods for determining fuel consumption and fuel efficiency in a vehicle described above are also applicable to HEVs. OBDII systems in HEVs are required to function identically to OBDII systems operating in standard gasoline or diesel powered vehicles. As long as the HEV's ignition is on, then the OBDII port provides the full supported range of OBDII information For a MAF-equipped HEV, when the vehicle is operating under battery-power, the MAF value returned by the OBDII port is always 0.0 g/s. This implies that the fuel consumed is zero. The method for determining fuel consumption for MAF-equipped vehicles, therefore, will record zero fuel consumed while the vehicle is battery-powered. When the vehicle is operating on hydrocarbon-based fuels, then MAF will be reported by OBDII as a non-zero value and hence will contribute to the fuel consumption total. The fuel consumption method will, therefore, accurately compute the actual fuel consumed, no matter what the mode of HEV engine operation.

The vehicle's speed (VSS) is also available through OBDII for both modes of engine operation in HEVs. The odometer calculation in the VIU, therefore, will always accumulate distance travelled, irrespective of whether the HEV is operating on battery-power or hydrocarbon-based fuels. Thus, the vehicle's fuel economy, expressed in litres per 100 kilometers, or in miles per gallon, is always an accurately represented value.

In addition to the odometer value, the VIU can also separately tally the distance travelled, while the HEV is either operating on electricity or hydrocarbon-based fuel. The decision to add distance travelled to either the odometer-electrical powered, or odometer-hydrocarbon fuel powered is based upon a zero or non-zero RPM value (for a MAF equipped HEV, a zero value for MAF may also be used). It may also be possible to use different OBDII data to determine the current power source, such a proprietary OBDII data request, to determine if an HEV's engine is currently being operated on electricity or a hydrocarbon-based fuel.

Figure 7:
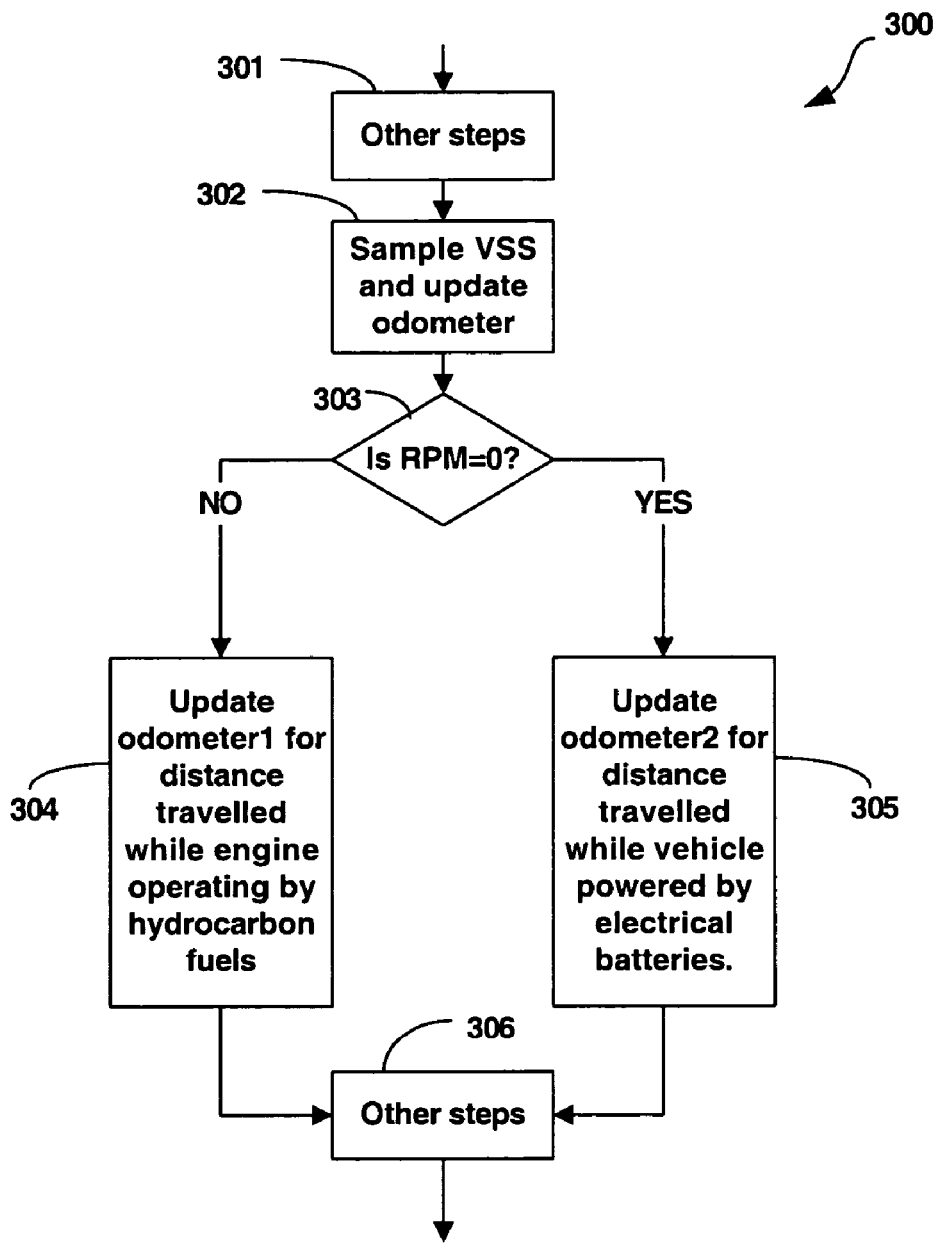
FIG. 7 illustrates odometer calculation for a Hybrid Electric Vehicle.

FIG. 7 shows a flowchart 300 illustrating an odometer calculation for a Hybrid Electric Vehicle, which determines distance travelled under hydrocarbon fuels and electrical power. Upon start, or after proceeding from other steps 301, the sampling of VSS and odometer updating is performed (step 302) by maintaining two odometer readings, namely odometer1 and odometer2. First, a query is made if "RPM=0" (step 303). If No (exit "NO" from step 303), the ododmeter1 is updated for distance travelled while engine operating by hydrocarbon fuels (step 304), followed by other step 306 as required. If YES (exit "YES" from step 303), the odometer2 is updated for distance travelled while vehicle is powered by electrical batteries (step 305), followed by other step 306 as required.

The flowchart 300 shown in FIG. 7 is intended to replace the odometer calculation step 110 in the MAF method of FIG. 2 and the step 212 of the MAP method of FIG. 6.

The MAF HEV fuel consumption method was tested in a 2002 Toyota Prius HEV. The vehicle was driven a total of 670 km, over a combined city/highway driving environment. The vehicle's digital displays indicated that the vehicle's fuel economy was 5.3 litres/100 km. The VIU determined that 34.9 litres of fuel were consumed, resulting in a fuel economy of 5.21 litres/100 km and an error of approximately 1.7% (it should be noted that this fuel consumption calculation was performed without the benefit of long term and short-term fuel trim corrections that are included in equation (10)).

On MAP equipped HEVs, the fuel consumption method also correctly computes fuel consumption as the vehicle switches between electrical and hydrocarbon-based propulsion. On MAP-equipped HEVs, the RPM is reported as zero when the vehicle is under electrical-only propulsion. When the vehicle is under electrical operation, then equation (10) will correctly calculate zero fuel consumed for these applicable time intervals.

OverVIU Fuel Consumption and Fuel Efficiency Calculation and Reporting—Individual Vehicles and Fleets of Vehicles All fuel consumption and odometer data from the VIU will be uploaded to the OverVIU server, which contains a database for vehicle data and web-based reporting software. All of the VIU data is available for analysis at the OverVIU.

The data described above and contained within the OverVIU's database is very detailed. For each trip a vehicle makes, the following fuel consumption-related data is stored:

Total fuel consumed and odometer at the beginning of the trip;

Total fuel consumed and odometer every 0.1 litre increment in fuel consumed;

Total fuel consumed and odometer at the end of the trip.

All of the above data has a date and time associated with it, i.e. when it was recorded in real-time within the VIU.

The fuel consumed by a vehicle can be computed during any two points in time or between two odometer values. As a general example, consider the fuel consumed during any time interval $t_{start}$ to $t_{end}$, where $t_{end} \geq t_{start}$. The fuel consumed can be calculated by taking the difference between the total fuel consumed at the end-points of the time interval, i.e.

$$\text{TFC}(t_{end}-t_{start}) = \text{TFC}(t_{end}) - \text{TFC}(t_{start}) \tag{11}$$

It should be recalled that the total fuel consumed (TFC), calculated and stored by the VIU, is the running total of the fuel consumed by the vehicle.

Fuel consumption data may not be present at the limits defined by either $t_{start}$ or $t_{end}$, as the vehicle may not have been running at the time.

Figure 8:
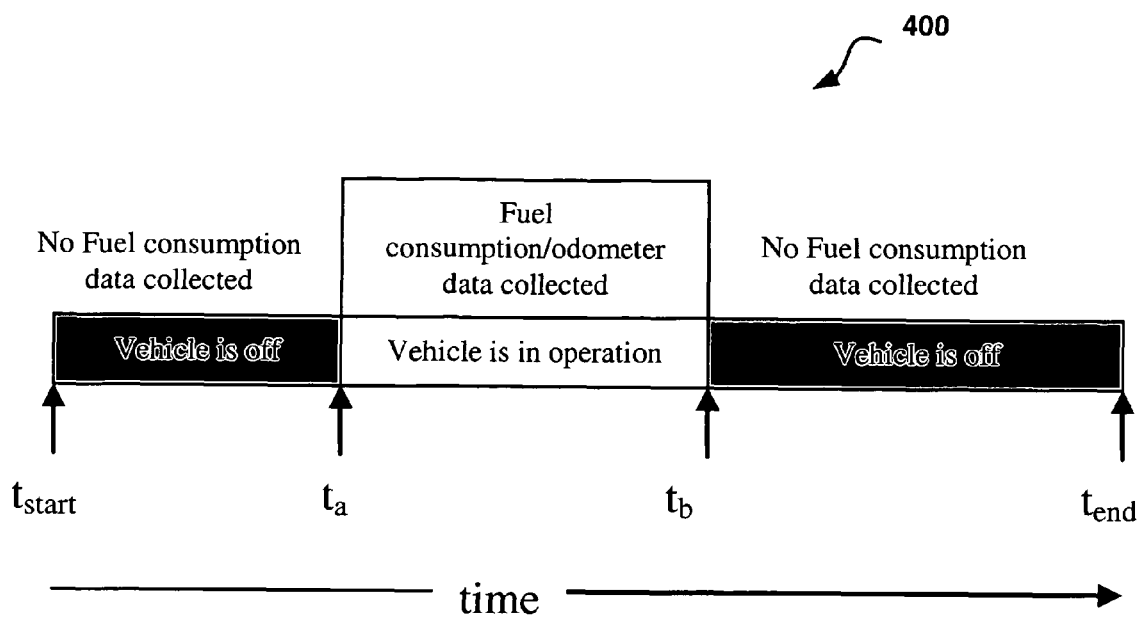
FIG. 8 illustrates a fuel consumption calculation requested for a specific time interval, when the vehicle has been operated for only a fraction of the requested time interval.

A diagram 400 in FIG. 8 illustrates one possible generic case, where the user has requested the fuel consumption data on the OverVIU to be reported for a specific time interval $t_{start}$ to $t_{end}$, but the vehicle was only in operation for a fraction of the time interval from $t_a$ to $t_b$. In this case, the OverVIU would search its database for fuel and odometer information for the vehicle and the total fuel consumed (in litres) would be reported using:

$$\text{TFC}(t_{end}-t_{start}) = \text{TFC}(t_{end}) - \text{TFC}(t_{start}) = \text{TFC}(t_b) - \text{TFC}(t_a) \tag{12}$$

The distance travelled by the vehicle (in km), during the same time period would be reported using;

$$\text{distance travelled}(t_{end} - t_{start}) = \text{odometer}(t_{end}) - \text{odometer}(t_{start}) \tag{13}$$
$$= \text{odometer}(t_b) - \text{odometer}(t_a)$$

The fuel efficiency, expressed in litres per 100 km, can be calculated using equations (12) and (13). For the specific time interval $t_{start}$ to $t_{end}$, the fuel efficiency is given by $$\text{fuel efficiency}(l/1000 \text{ km}) = \frac{\text{fuel consumed (litres)}}{\text{distance travelled (km)}} \times 100 \tag{14}$$
$$= \frac{\text{TFC}(t_b) - \text{TFC}(t_a)}{\text{odometer}(t_b) - \text{odometer}(t_a)}$$

The application of equation (14) assumes that the term in the denominator is non-zero. The denominator can be zero if the vehicle was idling and stationary during the time interval from $t_a$ to $t_b$. This is analogous to a fuel efficiency of 0 miles per gallon. It should be noted that equations (12) through (14) are also applicable to HEVs.

The OverVIU can report on fuel consumption or fuel efficiency for a single vehicle, a group of vehicles or an entire of fleet of vehicles, for user defined or "standardized" reporting periods, i.e. shift basis, daily, weekly, monthly or yearly.

Determining Fuel Consumption for Different Fuel Types and Grades

For gasoline powered vehicles, the MAF and MAP fuel consumption methods implemented in the VIU (see equations (5) and (10) respectively) can be programmed with a fuel density that is applicable to the vehicle (i.e. the fuel density for diesel or premium unleaded gasoline).

An alternate, and in some instances preferred, approach is to use a default fuel density for regular unleaded gasoline and correct the fuel consumption data for the different fuel density. This can be done on the OverVIU server via the use of a multiplicative correction factor. Let the default fuel density used in equations (5) and (10) be represented by $\rho_{fuel}$, and the actual fuel density is $\rho_{actual\,fuel}$. The multiplicative correction factor to be applied to equations (5) and (10), to account for the proper fuel density, is $$FC'(\Delta T) = \frac{\rho_{fuel}}{\rho_{actual\,fuel}} FC(\Delta T) \tag{15}$$

where $FC'(\Delta Y)$ is the density-corrected fuel consumption.

The fuel type for each vehicle is stored in the database on the OverVIU server. The density of the actual fuel ($\rho_{actual\,fuel}$) used in the vehicle can be obtained from a look-up table, also stored in the database. If the actual fuel type used in the vehicle is different from the default, i.e. regular unleaded fuel, then equation (15) can be applied to either the MAF method of equation (5), or the MAP method of equation (10).

The ability to correct the fuel consumption method on the OverVIU also provides the opportunity to correct fuel density based upon seasonal variation in the formulation of the fuel. For a seasonal correction to be applied, then the density of the actual fuel ($\rho_{actual\,fuel}$) would vary based upon the date of the fuel consumption data received from the vehicle.

The method of the present invention is generally applicable to any fuel type used in a vehicle, including but not limited to regular and premium unleaded gasoline, ethanol/gasoline blended fuels, propane, natural gas and diesel.

The methods of the present invention also address determining the fuel consumption for hybrid-electric vehicles (HEVs) that are equipped with OBDII.

The corresponding system for determining fuel consumption in a vehicle comprises a VIU including an on-board computer having memory, and a wireless modem, wherein a computer program code is stored in the memory for execution by the on-board computer to perform one or more of the methods for determining fuel consumption and efficiency in a vehicle as described in detail above.

Additionally, the system may include a central host (OverVIU), comprising a central computer having its own memory, the central host receiving data from the VIU either directly or through one or more VIUPoints (gateways), which are in wireless communication with the VIU, wherein a computer program code is stored in the memory of the central computer for execution by the central computer to perform some or all of the steps of the methods for determining fuel consumption and efficiency in a vehicle as described in detail above.

Thus, methods and system for determining fuel consumption and fuel efficiency in vehicles have been provided.

Although specific embodiments of the invention have been described in detail, it will be apparent to one skilled in the art that variations and modifications to the embodiments may be made within the scope of the following claims.

What is claimed is:

1. A method of determining fuel consumption in a vehicle, comprising:
   (a) determining fuel consumption by using mass air flow (MAF) sensor data or manifold air pressure (MAP) sensor data, including obtaining MAF data or MAP data in the vehicle, comprising:
   (b) obtaining long term and short term fuel trim values for the vehicle, which respectively characterize deviations of air-to-fuel stoichiometry in the vehicle due to aging and vehicle's current operating conditions: and
   (c) correcting the fuel consumption in the vehicle by applying said long term and short term fuel trim values to determine a corrected fuel consumption in the vehicle;
   the obtaining comprising sensing data in the vehicle through a vehicle diagnostic bus; and
   the sensing being performed in one or more of the following ways:
   sensing data at respective frequencies, which are substantially inversely proportional to the rates change of respective data;
   sensing data consecutively;
   sensing data concurrently;
   sensing data according to a random selection of their sampling order; or
   sensing selected data at a sampling frequency, which is dependent on a value of another data.

2. The method as described in claim 1, the vehicle diagnostic bus being onboard diagnostic II (OBDII) bus.

3. The method as described in claim 2, the step (a) comprising determining fuel consumption in the vehicle by using MAP data, only if MAF data is not available for the vehicle.

4. The method as described in claim 2, the obtaining long term and short term fuel trim values comprising obtaining a number of banks (pairs) of respective fuel trim values for each of the long term and short term fuel trim values, and determining average long term and short term fuel trim values over the respective number of banks.

5. The method as described in claim 4, wherein the number of banks is less or equal to 4.

6. The method as described in claim 1, the obtaining comprising sensing various data in the vehicle at respective various frequencies, which are substantially inversely proportional to a rate change of the respective data.

7. The method as described in claim 3, the vehicle diagnostic bus being onboard diagnostic II (OBDII) bus.

8. The method as described in claim 1, the determining (a) and the obtaining (b) comprising sampling various vehicle's data at respective various sampling frequencies, which are based on historic data for the respective vehicle's data.

9. The method as described in claim 1, further comprising transmitting data obtained in any of the determining (a), obtaining (b) or correcting (c) from the vehicle to a central host for further processing and storage.

10. The method as described in claim 1, further comprising determining fuel efficiency, comprising obtaining an odometer reading for the vehicle, and relating the fuel consumed by the vehicle over the distance identified by the odometer reading for the corresponding time interval to determine fuel efficiency.

11. The method as described in claim 1, further comprising identifying a type of the vehicle, the type including a hybrid electric vehicle (HEV), and determining fuel consumption in the HEV in accordance with the method of claim 1 within time intervals, during which the HEV is free from operating under electric power.

12. A vehicle interface unit (VIU), comprising:
   a (VIU) computer having a CPU and non-volatile memory (NVM);
   the VIU computer is connected to the vehicle diagnostic bus providing access to sensors in the vehicle for collecting vehicle related data through the vehicle diagnostic bus;
   the NVM comprising a computer program code stored thereon for execution by the CPU, causing the computer to determine fuel consumption in the vehicle in accordance with the method of claim 1.

13. The VIU as described in claim 12, further comprising a wireless modem connected to the VIU computer and providing communication over a wireless link with a gateway (wireless access point), which is connected to a communications network, the communications network providing transmission of data between the gateway and a central host.

14. A vehicle telemetric system, comprising:
   a central host connected to a communications network;
   one or more gateways connected to the communications network, the communications network enabling the transfer of data between the gateways and the central host;
   a vehicle interface unit (VIU) within a vehicle having access to sensors in the vehicle for collecting vehicle related data through a vehicle diagnostic bus, the VIU having means for communication over a wireless link with any of said gateways provided the vehicle is within a transmission range of one of said gateways;
   the VIU comprising a VIU computer having a CPU and non-volatile memory (NVM), the VIU being connected to the vehicle diagnostic bus;
   the NVM comprising computer readable instructions stored thereon for execution by the CPU, causing the VIU computer to determine fuel consumption in the vehicle in accordance with the method of claim 1.

15. An access system for use in a vehicle telemetric system, the telemetric system comprising a central host connected to a communications network, the access system comprising:
   one or more vehicle interface units (VIUs) and a gateway, the gateway being connected to the communications network,
   each VIU being located in a different vehicle and having access to sensors in the vehicle for collecting vehicle related data through a vehicle diagnostic bus, each VIU having means for communication over a wireless link with the gateway, the wireless link being activated provided the vehicle is within a transmission range of the gateway;
   each VIU comprising a VIU computer having a CPU and non-volatile memory (NVM), the VIU computer being connected to the vehicle diagnostic bus;
   the NVM comprising a computer program code stored thereon for execution by the CPU, causing the VIU computer to determine fuel consumption in the vehicle in accordance with the method of claim 1;
   the gateway having another memory for storing the fuel consumption data received from the VIU, and a gateway means for forwarding the data to the central host.

16. A method for determining a fuel consumption of a vehicle in a vehicle telemetric system, the vehicle telemetric system comprising a central host connected to a communications network, one or more gateways connected to the communications network, each gateway having a wireless transmission range, a vehicle interface unit (VIU) within a vehicle having access to sensors in the vehicle for collecting vehicle related data through a vehicle's bus, the VIU having means for wireless communication with any of said gateways, the method comprising:
  (a) determining fuel consumption in the vehicle as described in claim 1:
  (d) determining if the VIU is within the wireless transmission range of one of the gateways;
  (e) forwarding some or all the fuel consumption data from the VIU to the one of said gateways over a wireless link;
  (f) forwarding said some or all of the fuel consumption data received by the one of said gateways from the one of said gateways to the central host over the communications network; and
  (g) notifying each gateway by the central host regarding said some or all fuel consumption data that have been already received at the central host.

17. A multi-user motor vehicle telemetric system, comprising:
  (a) one or more central hosts connected to a communications network, each central host being associated with one or more users of the system;
  (b) one or more gateways connected to the communications network, for transfer of data between the gateways and the central hosts;
  (c) one or more vehicle interface units (VIUs), each VIU being placed within a respective vehicle and having access to sensors in the vehicle for collecting vehicle related data through a vehicle diagnostic bus in the vehicle, each VIU having a wireless modem for communication over a wireless link to gateways, which are designated to be accessed by said each VIU, each VIU being associated with one or more of said users;
  (d) each central host having means for selecting gateways and collecting data from each VIU, which is associated with the users that the central host is associated with;
  (e) each gateway having means for recognizing central hosts and VIUs belonging to the same user; and
  (f) each VIU comprising a VIU computer having a CPU and non-volatile memory (NVM), the VIU being connected to a vehicle diagnostic bus in the vehicle; and
  (g) the NVM comprising a computer program code stored thereon for execution by the CPU, causing the VIU computer to determine fuel consumption in the vehicle in accordance with the method of claim 1.

18. A method for collecting vehicle performance data in a multi-user motor vehicle telemetric system, comprising one or more central hosts connected to a communications network, each central host being associated with one or more users of the system, one or more gateways connected to the communications network, the communications network enabling the transfer of data between the gateways and the central hosts, one or more vehicle interface units (VIUs), each VIU placed within a respective vehicle having access to sensors in the vehicle for collecting vehicle related data, each VIU having means for communication over a wireless link to gateways designated to be accessed by said each VIU provided the VIU of the vehicle is within a transmission range of one of said designated gateways, and each VIU is associated with one or more of the users, the method comprising:
  (a) at each central host, selecting gateways for collecting data from each VIU which is associated with the users that the central host is associated with;
  (b) at each central host specifying for each user the data to be collected from its associated VIUs through data collection profiles which are stored in the central host and the selected gateways;
  (c) at each gateway determining the association between central hosts and VIUs belonging to the same user; and
  (d) at each VIU, determining fuel consumption in the vehicle containing the VIU, in accordance with the method of claim 1.

19. A method for determining fuel consumption in a vehicle, comprising:
  (a) determining fuel consumption by using mass air flow (MAF) sensor data or manifold air pressure (MAP) sensor data, including obtaining MAF data or MAP data in the vehicle, comprising:
    (b) obtaining long term and short term fuel trim values for the vehicle, which respectively characterize deviations of air-to-fuel stoichiometry in the vehicle due to aging and vehicle's current operating conditions: and
    (c) correcting the fuel consumption in the vehicle by applying said long term and short term fuel trim values to determine a corrected fuel consumption in the vehicle;
the obtaining comprising sensing data in the vehicle through a vehicle diagnostic bus:
the obtaining, long term and short term fuel trim values comprising Obtaining a number of banks (pairs) of respective fuel trim values for each of the long term and short term fuel trim values, and determining average long term and short term fuel trim values over the respective number of banks;
the determining (a) comprising one of the following:
  (i) determining fuel consumption in the vehicle by using MAF data for the time interval $\Delta T = N \cdot \Delta t_i$ as follows:

$$\frac{1}{AF_{ratio} \times \rho_{fuel} \times 1000 \text{ ml/l}} \sum_{i=1}^{N} (MAF(t_i) \times \overline{LONGFT_i} \times \overline{SHRTFT_i} \times \Delta t_i)$$

$AF_{ratio}$ is air-to-fuel stoichiometric ratio, $\rho_{fuel}$ is fuel density in g/ml, $MAF(t_i)$, $\overline{LONGFT_i}$, and $\overline{SHRTFT_i}$ are respectively MAF data, average long term, and average short term fuel trim data at time instance $t_i$: or
  (ii) determining fuel consumption in the vehicle by using MAP data for the time interval $\Delta T = N \cdot \Delta t_i$, as follows:

$$\frac{VE \times ED \times M_{air}}{120 \times R \times AF_{ratio} \times \rho_{fuel} \times 1000 \text{ ml/l}}$$

$$\sum_{i=1}^{N} \frac{RPM_i \times MAP_i \times \overline{LONGFT_i} \times \overline{SHRTFT_i}}{(IAT_i + 273.12)} \Delta t_i$$

VE is Volumetric Efficiency for the vehicle (unitless), MAP is Manifold Air Pressure (kPa), ED is Engine Displacement (liters), R is ideal gas constant 8.314 kPa K$^{-1}$ mol$^{-1}$, and $M_{air}$ is molar mass of air (g/mol)=28.97 g/mol; $RPM_i$, $MAP(t_i)$ $\overline{LONGFT_i}$, $\overline{SHRTFT_i}$ and $IAT_i$ are respectively Revolution Per Minute (min$^{-1}$) of an engine, Manifold Air Pressure sensor data, average long term, average short term fuel trim data, and Intake Air Temperature (degrees Celsius) at time instance $t_i$,
  comprising sensing a revolution per minute (RPM), and intake air temperature (IAT) in the vehicle.

20. The method as described in claim 19, the fuel density $\rho_{fuel}$ being adjusted according to seasonal temperature variations.

21. The method as described in claim 20, the transmitting to the central host comprising
wirelessly transmitting the fuel consumption data from the vehicle to a gateway (wireless access point) connected to a communications network, the communications network enabling the transfer of data between the gateway and the central host.

22. The method as described in claim 20, the determining (a) and the correcting (c) comprising distributed determining of fuel consumption by using processing power of more than one computer, including initial processing of data in the vehicle, followed by final processing of data at the central host.

23. A vehicle interface unit (VIU) for a vehicle telemetric system, the vehicle telemetric system comprising a central host connected to a communications network and one or more gateways connected to the communications network enabling the transfer of data between the gateways and the central host, the VIU being located in a vehicle and having access to sensors in the vehicle for collecting vehicle related data through a vehicle diagnostic bus, the VIU having means for communication over a wireless link with any of said gateways, the wireless link being activated provided the vehicle is within a transmission range of the one of said gateways, and another wireless link being activated provided the vehicle is within a transmission range of another one of said gateways;
the VIU further comprising a VIU computer having a CPU and non-volatile memory (NVM), the VIU computer being connected to the vehicle diagnostic bus;
the NVM comprising a computer program code stored thereon for execution by the CPU, causing the computer to determine fuel consumption in the vehicle in accordance with the method of claim 19.

24. A vehicle telemetric system, comprising:
a central host connected to a communications network;
one or more gateways connected to the communications network, the communications network enabling the transfer of data between the gateways and the central host;
a vehicle interface unit (VIU) within a vehicle having access to sensors in the vehicle for collecting vehicle related data through a vehicle diagnostic bus, the VIU having means for communication over a wireless link with any of said gateways provided the vehicle is within a transmission range of one of said gateways;
the VIU comprising a VIU computer having a CPU and non-volatile memory (NVM), the VIU being connected to the vehicle diagnostic bus;
the NVM comprising computer readable instructions stored thereon for execution by the CPU, causing the VIU computer to determine fuel consumption in the vehicle in accordance with the method of claim 19.

25. An access system for use in a vehicle telemetric system, the telemetric system comprising a central host connected to a communications network, the access system comprising:
one or more vehicle interface units (VIUs) and a gateway, the gateway being connected to the communications network,
each VIU being located in a different vehicle and having access to sensors in the vehicle for collecting vehicle related data through a vehicle diagnostic bus, each VIU having means for communication over a wireless link with the gateway, the wireless link being activated provided the vehicle is within a transmission range of the gateway;
each VIU comprising a VIU computer having a CPU and non-volatile memory (NVM), the VIU computer being connected to the vehicle diagnostic bus;
the NVM comprising a computer program code stored thereon for execution by the CPU, causing the VIU computer to determine fuel consumption in the vehicle in accordance with the method of claim 19;
the gateway having another memory for storing the fuel consumption data received from the VIU, and a gateway means for forwarding the data to the central host.

26. A method for determining fuel consumption in a vehicle, comprising:
determining fuel consumption by using manifold air pressure (MAP) sensor data, including obtaining MAP data in the vehicle through a vehicle diagnostic bus, comprising:
determining volumetric efficiency (VE) of the vehicle as follows:
(i) selecting time interval and setting VE=1;
(ii) determining total fuel consumed by the vehicle during all selected time intervals according to an independent refuelling measurement ($TFC_M$);
(iii) determining total fuel consumed by the vehicle during all selected time intervals according to the method of claim 3 ($TFC_V$) by using the current value of VE;
(iv) updating the current value of VE=$TFC_M/TFC_V$; and
(v) selecting another time interval and repeating the steps (ii) to (iv) a number of times to achieve a required accuracy for the current value of VE.

27. The method as described in claim 26, the vehicle diagnostic bus being onboard diagnostic II (OBDII) bus, and the determining (ii) comprising manual or automatic refuelling measurement at a gas pump.

28. A vehicle interface unit (VIU), comprising:
a (VIU) computer having a CPU and non-volatile memory (NVM);
the VIU computer is connected to the vehicle diagnostic bus providing access to sensors in the vehicle for collecting vehicle related data through the vehicle diagnostic bus;
the NVM comprising a computer program code stored thereon for execution by the CPU, causing the computer to determine fuel consumption in the vehicle in accordance with the method of claim 26.

29. A vehicle telemetric system, comprising:
a central host connected to a communications network;
one or more gateways connected to the communications network, the communications network enabling the transfer of data between the gateways and the central host;
a vehicle interface unit (VIU) within a vehicle having access to sensors in the vehicle for collecting vehicle related data through a vehicle diagnostic bus, the VIU having means for communication over a wireless link with any of said gateways provided the vehicle is within a transmission range of one of said gateways;
the VIU comprising a VIU computer having a CPU and non-volatile memory (NVM), the VIU being connected to the vehicle diagnostic bus;
the NVM comprising computer readable instructions stored thereon for execution by the CPU, causing the VIU computer to determine fuel consumption in the vehicle in accordance with the method of claim 26.

* * * * *